United States Patent

[11] 3,583,278

[72] Inventors Meriwether L. Baxter, Jr.
Pittsford;
Edward Stark, Rochester, both of, N.Y.
[21] Appl. No. 769,187
[22] Filed Oct. 21, 1968
[45] Patented June 8, 1971
[73] Assignee The Gleason Works
Rochester, N.Y.

[54] METHODS OF CUTTING BEVEL GEARS
21 Claims, 20 Drawing Figs.
[52] U.S. Cl............................................ 90/5, 90/1
[51] Int. Cl............................................ B23f 9/10
[50] Field of Search................................ 90/5, 6, 9.4, 1

[56] References Cited
UNITED STATES PATENTS
2,139,154 12/1938 Galloway.................. 90/1X
3,288,031 11/1966 Krastel et al.............. 90/5
3,354,782 11/1967 Buchanan et al.......... 90/1

Primary Examiner—Gil Weidenfeld
Attorneys—Cushman, Darby and Cushman and Morton A. Polster ABSTRACT: The present invention comprises novel methods and techniques for the rough cutting of bevel gears, particularly spiral bevel or hypoid pinions, wherein there is contemplated a two-stage roughing operation to be followed by finishing operations. In the preliminary or first stage roughing operation, the tapered tooth slots will only be cut to partial depth, and not to the desired, final roughed depth, and the cutting action will comprise a relative plunge feed between tool and work followed by a cutting generating roll. This generating roll will be abbreviated or of a lesser amplitude than the generating roll that would be required to cut the roughed tooth slot by a generating action alone. In the second stage roughing operation, the tapered tooth slots preferably are roughed out to full or substantially full depth with a full generating roll, and with cutting action taking place on both the forward and return generating rolls, so as to more closely approximate the final, finished tooth shape whereby finishing operations may be facilitated.

It is also contemplated that this two-stage roughing operation be performed with cutting going on simultaneously on two workpieces, one at each roughing station, and further be combined with a process utilizing means for automatically loading and unloading the work at the two roughing stations, with the workpieces being automatically transferred from the first to the second roughing station with automatic stock division taking place in that transfer, and with a feeding of the workpieces to a first region where they are to be moved to the first roughing station, and with a discharge region for receiving the final roughed workpieces from the second roughing station for ultimate transfer to a finishing operation.

INVENTORS
MERIWETHER L. BAXTER, JR.
EDWARD STARK
BY Cushman, Darby & Cushman
ATTORNEYS

MERIWETHER L. BAXTER JR.
EDWARD STARK
*INVENTORS*

BY
*Cushman Darby & Cushman*
ATTORNEYS

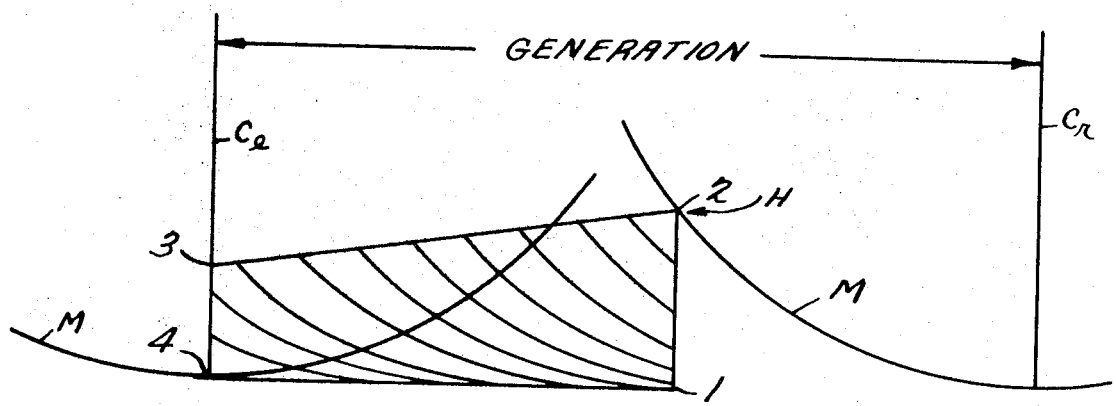
Fig. 4.
RIC ROUGHING
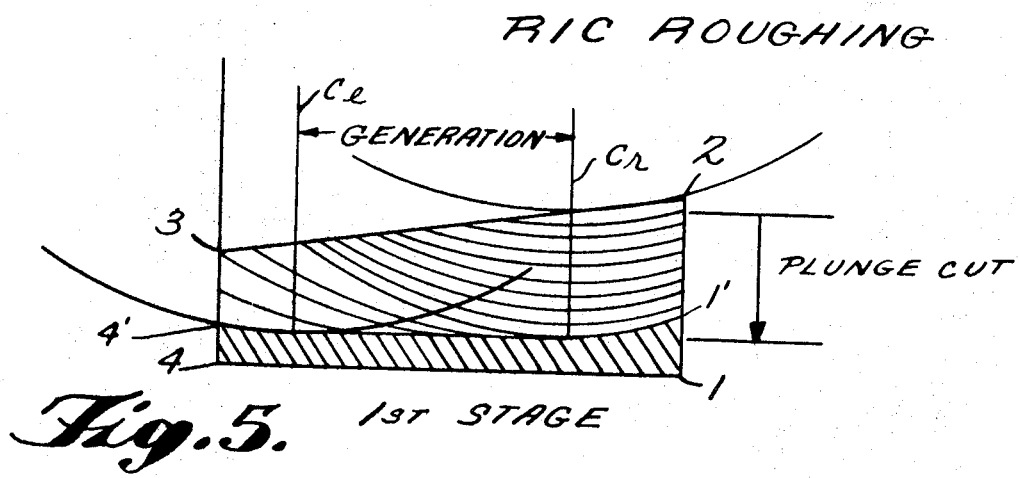
Fig. 5. 1st STAGE
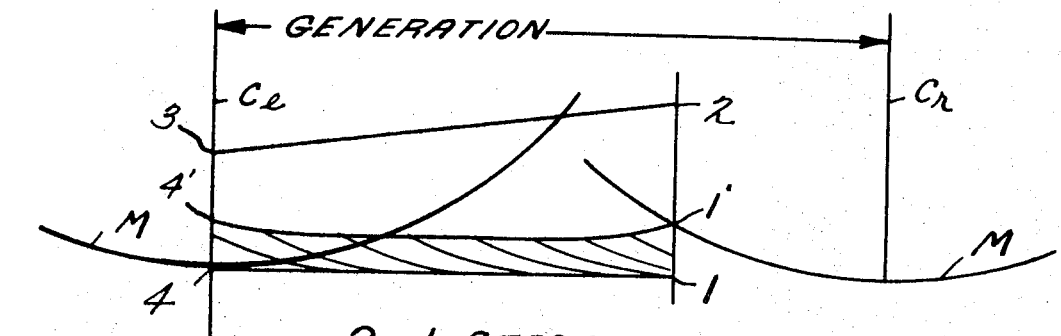
Fig. 6. 2nd STAGE
INVENTORS
MERIWETHER L. BAXTER, JR.
EDWARD STARK
BY Cushman, Darby & Cushman
ATTORNEYS INVENTORS
MERIWETHER L. BAXTER, JR.
EDWARD STARK
BY Cushman, Darby & Cushman
ATTORNEYS

INVENTORS
MERIWETHER L. BAXTER, JR.
EDWARD STARK

BY Cushman, Darby & Cushman
ATTORNEYS

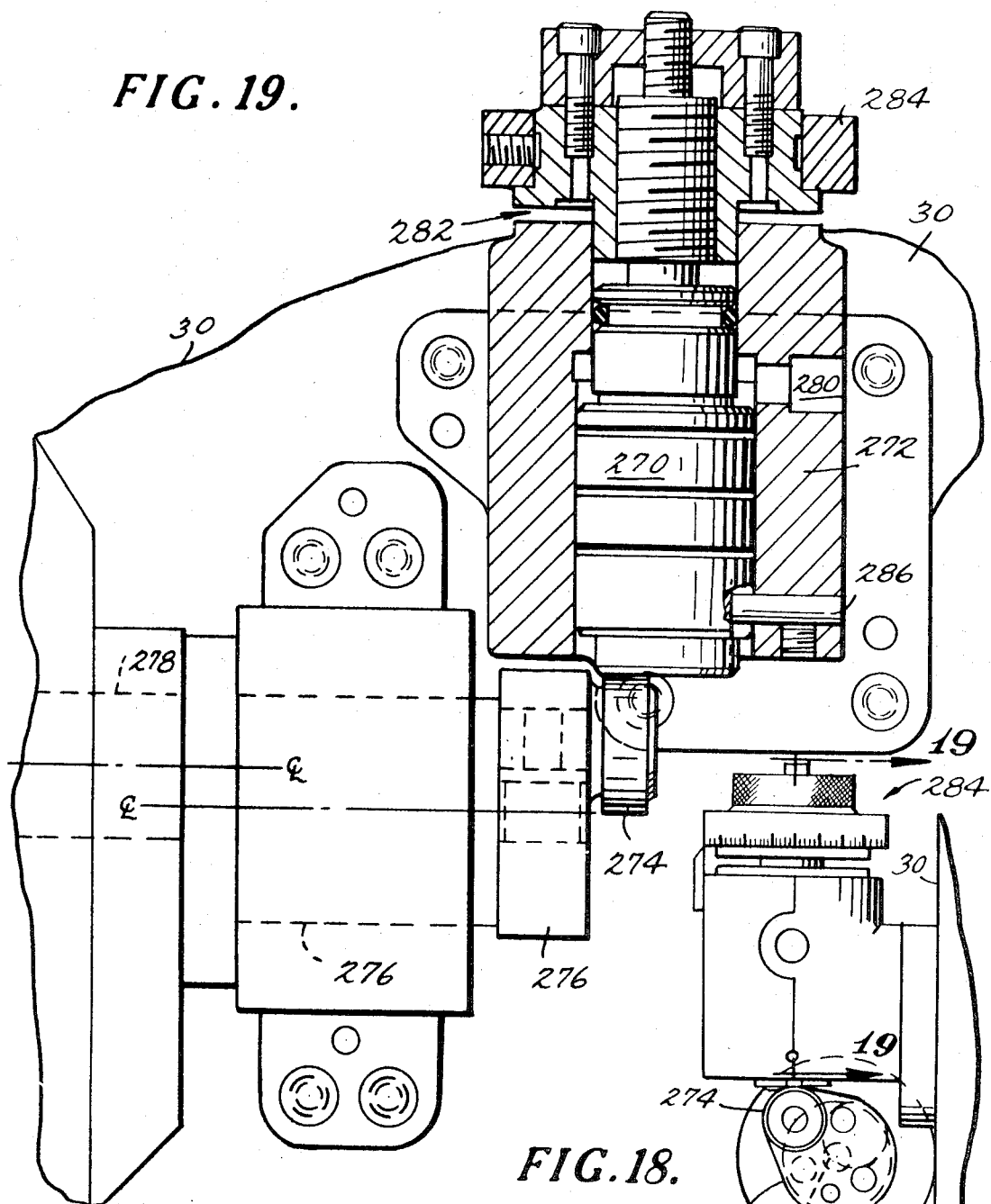

3,583,278

METHODS OF CUTTING BEVEL GEARS

BACKGROUND AND OBJECTS

The present invention relates to gear-making, and in particular to methods and techniques for cutting bevel gears.

The present invention is part of an overall, general development of the Gleason Works which includes several inventions besides that disclosed and claimed herein. This development includes other inventions such as a novel structural orientation of cradle, workhead assembly and associated structures, by themselves, and in combination with novel control means for the generating train, novel cradle housing and cradle assembly, a novel ratio control or ratio change mechanism, a novel workhead assembly, novel means for conveying gears or gear blanks to the cutting stations and transferring them between cutting stations with novel means for automatic stock division in going from one station to the other, a novel control means for controlling the operation of the work loading and unloading and automatic stock division mechanisms, a novel chamfering means designed to remove burrs, etc. from the roughed gears, and other novel structures and techniques, all of which are being covered in a series of patent applications. These applications are: Ser. Nos. 764,212, 764,213, 764,214, 764,221, 764,222, 764,217, 764,218, 764,219, 764,220, 764,215, and 764,216, filed Oct. 1, 1968, and the disclosures of which are all incorporated herein by reference. Application Ser. No. 764,215 issued on June 14, 1970 as U.S. Pat. No. 3,520,227.

While the present development relates especially to the production of bevel pinion gears for the automotive industry, for example, spiral bevel or hypoid gears, it will be apparent to those skilled in the art that features of the development may be used in machines for making other types of gears, and for industries other than the automotive industry.

An object of the present invention is to provide novel processes and techniques for the rough cutting of bevel gears, particularly spiral bevel or hypoid gears, and especially adapted to produce roughed gears in less time for a higher production rate and at a lower overall cost of production per roughed gear than in previous methods.

In the illustrative embodiment of the invention, to be described in more detail hereinbelow, it will be seen that there is provided a novel preliminary or first-stage roughing operation, and a novel combination of that first stage roughing operation with a second stage roughing operation wherein the second stage roughing operation preferably includes structures and techniques as disclosed in the copending application of Hunkeler et al., "Improvements in Ratio-Change and Set-Over Mechanisms in Bevel Gear Making Machines," Ser. No. 764,214 filed on Oct. 1, 1968. This combined, two-stage roughing operation is designed to produce roughed pinions in less time and with less cutter wear than in previous machines, and, further, it is especially designed to be utilized in combination with a two-stage finishing operation, with automatic loading and unloading of gear blanks and automatic transfer of work between the two roughing stages, and between the two finishing stages, as disclosed in the copending applications of Helfer et al., "Apparatus for Transferring Work Blanks and Work Pieces in Bevel Gear Making Machines," Ser. No. 764,219 and Hunkeler et al., "Control Apparatus for Checking and Controlling Sequential Machine Operations," Ser. No. 764,220 both filed on Oct. 1, 1968. In this combined, two-stage roughing operation, cutting action will be taking place simultaneously on two different workpieces, one at each roughing station.

In the first stage roughing operation, as contemplated in the present invention, the tooth slot that is produced is left shallow, that is to say, it is not cut to the full depth desired for the final roughed gear, and this enables a cutter to be utilized with cutter blades of substantially larger point width than was practicable in the past, whereby, among other advantages, the cutter blades will have a longer life and will be stronger so as to enable better and faster cutting action. In the exemplary embodiment of the invention, the first cutting action in the first stage roughing operation will be a plunge cut performed at or in the region of the heel of the workpiece, and thereafter there will be a forward generating roll during which a cutting action will take place, and this generating roll will be curtailed or abbreviated, including only a central portion of the roll that would otherwise have been required if the roughed tooth slot were to be cut entirely during generation and in a generating roll.

This abbreviated generating roll of the first stage roughing of the present invention will thus enable the time for the cutting cycle to be shortened, as will be understood. The relative depth or plunge feed between the work and tool is utilized at the start of cutting any tooth slot and provides for getting into the desired, partial depth before starting generation, as will be understood. After the forward generating cutting roll is completed, there will be a return roll, as is understood, and this return roll preferably is effected without any cutting action during the first stage roughing, and there will be relative withdrawal between work and tool, and indexing of the work, after which the first stage roughing action will be repeated for the next tooth slot, and so on, until the workpiece has completely received its first stage roughing.

In the preferred embodiment, this first stage roughing will be accomplished without utilizing a ratio change mechanism or any of the set-overs, as disclosed in the copending application of Hunkeler et al., "Improvements in Set-Over and Setover Mechanisms in Bevel Gear Making Machines," referred to above. Thus, in the first-stage roughing, the generation may be advantageously altered or set up so as to produce a suitable average shape for the tooth slots, in view of the further roughing operation to be performed thereon at the second roughing station.

It is thus a further and more specific object of the invention to provide a first-stage roughing operation in bevel gear making wherein the rate of depth feed, rate of generation, and ratio of time spent for these motions may be optionally controlled to achieve minimum production time and maximum cutter life. For producing gears having short face and deep teeth, the first stage roughing operation will involve mainly plunge or depth feed and little generation, as will be understood. Conversely, for producing gears having long face and shallow teeth, there will be a larger percentage of generation. Furthermore, the depth of the first stage rough cutting and the amount of the cutting roll utilized preferably will be designed so as approximately to balance the cutting time and cutter wear with the subsequent second stage rough cutting operation.

Further objects and advantages of the invention include the following: the first stage roughing operation will be highly efficient since the majority of the metal may be removed using a tool, or cutter blade, of wide point width that is not only inherently stronger than those with narrower point widths, but also is able to conduct heat away from the tip of the cutter blade more efficiently, resulting in lower tip temperatures, more efficient cutting operation, and longer cutter life; because of the shallow slot in this first stage roughing operation, the coolant is better able to reach the cutting zone, providing for a more efficient and effective overall cutting action; the second stage roughing operation can be now performed at higher speeds without undue cutter wear by reason of the fact that the greatest part of the material has already been removed in the first-stage roughing operation, and furthermore the relatively shallow cut from the first roughing stage will permit good coolant penetration to the cutting region during the second-stage roughing operation; and the second-stage roughing operation may advantageously be designed to have a controlled, nonuniform rate of generating roll in order to accommodate the nonuniform stock left by the abbreviated generation in the first stage roughing, and the second stage roughing may also advantageously be designed to utilize the ratio change mechanism, cradle rotational setover, cradle axial setover and hypoid offset setover as disclosed in the abovementioned copending application of Hunkeler et al., ("Improvements in Ratio-Change and Setover Mechanisms in Bevel Gear Making Machines"), referred to above.

In the illustrative embodiment of the invention, the two roughing stages will be shown and described as being provided by a double roughing machine of the type disclosed in the copending application of Hunkeler et al., ("Improvements in Ratio-Change and Setover Mechanisms in Bevel Gear Making Machines"), with certain modifications to the first roughing stations, as will be referred to below, and with a conveyor means for feeding gear blanks to the machine, and with automatic work loading and unloading at the two roughing stages or stations, and automatic work transfer between the two stages with automatic stock division, and with subsequent depositing of the final roughed gears at a discharge region, for example, back on the conveyor means, as disclosed in the copending applications o of Helfer et al., "Apparatus for Transferring Work Blanks and Work Pieces in Bevel Gear Making Machines," and Hunkeler et al., "Control Apparatus for Checking and Controlling Sequential Machine Operations," filed on Oct. 1, 1968. Thus, a high speed and highly automated production process will be provided wherein roughed gears will be produced at higher production rates, in less time, and at lower overall costs. Additionally, it is also contemplated, in the illustrative embodiment of the present development, that the roughed gears be transferred to a double finishing machine of the type disclosed in the copending applications of Hunkeler et al., ("Improvements in Bevel Gear Making," Ser. No. 764,212), Helfer et al. ("Apparatus for Transferring Work Blanks and Work Pieces in Bevel Gear Making Machines") and Hunkeler et al. ("Control Apparatus for Checking and Controlling Sequential Machine Operations"), filed Oct. 1, 1968, after being chamfered by a suitable chamfering means, such as that disclosed in the copending application of Hunkeler et al., ("Chamfering Means," Ser. No. 764,216), filed on Oct. 1, 1968, whereby a more fully automated production line will be provided for producing finished gears, especially spiral bevel or hypoid pinions, from gear blanks. Because of the high speed operation of the double finishing machine, it will also be desirable to have a high production rate for the double roughing machine, and the present invention provides a first-stage roughing operation and a combined first and second-stage roughing operation eminently suitable to be utilized with the high speed double finisher, of the type referred to above and with a production rate coordinated to the production rate of the double finisher.

It might be noted that the improved efficiency of the two-stage roughing method of the present invention over previously proposed methods for completely roughing gear blanks in one roughing stage, (for example, as disclosed in the Krastel et al., Pat. No. 3,288,031) derives primarily from separating the two basic functions, namely, metal removal and shape control, into two separate operations in which each can be performed optionally, and effecting this separation in such a way that the cutting time may be advantageously equal for the two stages so as to permit combining the two stages in a single automatic machine, as referred to above.

Further objects and advantages of the invention will be in part obvious and in part pointed out hereinafter.

The novel features of the invention may best be made clear from the following description and accompanying drawings in which:

FIG. 4 is a schematic view of a tooth slot, in elevation, and illustrating the extent or amplitude of generation necessary to rough cut a slot of that length and shape by generation alone;

FIG. 5 is a schematic view corresponding to FIG. 4 and illustrating a combined plunge cut and generating roll for the first stage roughing operation, embodying the invention, and showing by comparison with FIG. 4 the abbreviated or shortened amplitude of generation permitted or made possible by the present invention;

FIG. 6 is a view corresponding to FIG. 5 and illustrating a generating action as would be contemplated in the second stage roughing operation and indicating the amount of stock left at the bottom of the tooth slot at the end of the first-stage roughing operation and which will be removed during the second roughing stage;

FIG. 18 is an elevational view of structure designed to be utilized in the cradle axial setover mechanism in the second stage roughing operation;

FIG. 19 is an enlarged elevational view of the structure shown in FIG. 18 and partially sectioned along the line 19-19 in FIG. 18;

DETAILED DESCRIPTION

Figure 9:
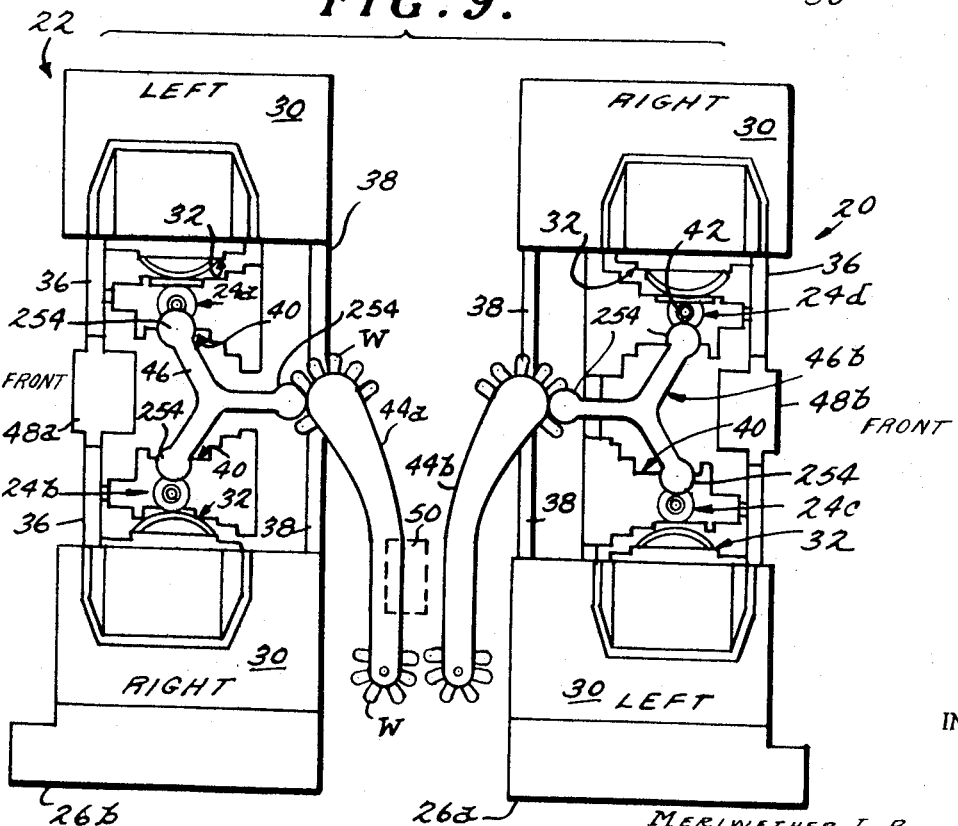
FIG. 9 is a schematic plan view, again on a reduced scale, illustrating a double roughing machine and a double finishing machine that may be arranged together to provide a single production line, wherein the double roughing machine will be utilized to practice the novel rough cutting processes of the present invention.

Referring now to the drawings, FIG. 9 shows two double gear cutting machines 20, 22 illustrative of automatic pinion machines of the present development, as described in the copending application of Hunkeler et al., "Improvements in Bevel Gear Making," referred to above. The machine 20 is a double finishing machine wherein each of the cutting stations has a finishing operation performed thereat, while the machine 22 is a double roughing machine illustrative of a machine in which the novel rough-cutting processes of the present invention may be utilized. The roughing machine 22 is shown as including two cutting stations 24a, 24b arranged on a suitable frame means, and wherein each cutting station includes a cradle housing 30 containing the cradle 32 and toolholder 34 (shown in FIG. 10), with the cradle housing mounted for adjustable movement on the base frame means, as disclosed in the copending applications of Hunkeler et al., "Improved Cradle Assembly for Gear Cutting Machines and Means for Moving Cradle Axially," Ser. No. 764,222, "Means for Supporting Cradle and Cradle Housing," Ser. No. 764,221. The toolholder 34 is mounted for rotation within the cradle 32 and about a horizontal axis which may be adjusted within a certain range or ranges of positions, as will be understood. The toolholder is designed to mount a rotary face mill cutter and the rotary toolholder, face mill cutter and adjustable means in the cradle for adjusting the position and angle of the face mill cutter and rotary toolholder may be conventional, as disclosed, for example, in U.S. Pat. No. 2,667,818.

The double roughing machine 22 is shown as including upstanding flanges or sidewalls 36, 38 suitably mounted on the base frame means and extending upwardly therefrom. A workhead assembly 40 is mounted between these sidewall members and includes a rotatable workholder 42 mounted therein and designed to receive the work that is to be cut so that the work is rotatable about a vertical or generally vertical axis, as is disclosed in the copending application of Hunkeler et al., "Workhead Assembly and Mounting Therefor, in Bevel Gear Making Machines," Ser. No. 764,221.

Figure 7:
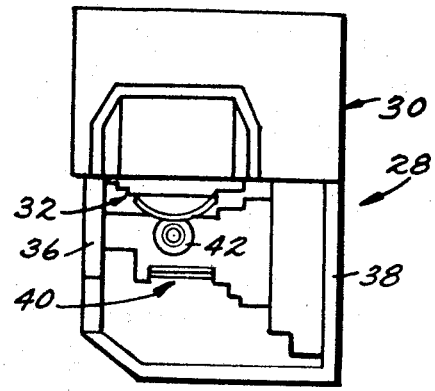
FIG. 7 is a schematic plan view, on a reduced scale, illustrating a single roughing machine that may be utilized in practicing the first stage roughing operation of the present invention.

In the copending application of Hunkeler et al., "Improvements in Bevel Gear Making," the double finishing machine 20 is shown as being of the same or of a similar design to the double roughing machine 22, except for certain structural modifications therein adapting it for finishing rather than roughing, as will be understood to those skilled in the art, and as will be apparent from the series of applications covering the present development, as referred to above and filed on Oct. 1, 1968. Thus, like reference numerals have been utilized in FIGS. 8 and 9 to designate corresponding parts of the double roughing and double finishing machines. FIG. 7 illustrates a single roughing machine, similar to the upper half of the double roughing machine 22 shown in FIG. 9, and also embodying the present development, wherefore like reference numerals have again been utilized to designate like parts.

The novel processes of the present invention for first-stage roughing and for combined first and second stage roughing are especially designed to be utilized in combination with a double roughing machine such as the machine 22 shown in FIG. 9 and disclosed in the series of copending applications referred to above; however, it will be understood that these novel rough cutting processes and the principles involved therein, or portions thereof, may be practiced in a single roughing machine having only a single cutting station, such as the single machine illustrated in FIG. 7. Additionally, these same novel rough cutting processes and principles involved therein may be practiced in whole or in part in connection with roughing machines other than the specific roughing machines shown in FIGS. 7 and 9, as will be understood.

As disclosed in the copending application of Hunkeler et al., "Improvements in Ratio-Change and Setover Mechanisms in Bevel Gear Making Machines," there is provided a novel ratio change mechanism, and a novel combination of setovers, including cradle rotational, cradle axial, and hypoid offset setovers, which may be utilized in roughing operations. According to the present invention, that ratio change mechanism and those setovers preferably are utilized only in the second or final roughing operation, and may be, and preferably are, entirely omitted from the first stage roughing, as will be described in more detail hereinbelow, with the accompanying advantages of a more simplified construction with fewer parts for the generating train and associated structures in the first roughing station.

THE DRIVING ARRANGEMENT

It will be understood that in generation of bevel gears, such as spiral bevel or hypoid gears, there commonly are two basic elements, the cradle and the work spindle, both of these being located in a certain spaced relationship with one another and rotating in a predetermined timed relationship on their respective axes. Conventionally, the cradle carries a rotating, multibladed face mill cutter (not shown) whose axis is in adjustable but stationary position relative to the cradle, offset from and generally inclined to the axis of the cradle on which it is mounted. The cradle and cutter mounted thereupon represent the imaginary "generating gear," as is understood, and the rotating cutter blade edges represent a tooth of this imaginary "generating gear." The work spindle carries the work being cut; the cradle carrying the cutter rotates about the cradle axis in timed relation to the rotation of the work spindle with the rotating cutter in engagement with the work. Thus the imaginary "generating gear" is said to roll with the workpiece.

The roll proceeds sufficiently to complete the generation of one tooth slot (or in some cutting operations, one side of one previously roughed tooth slot), whereupon there is a withdrawal so that the cradle with its cutter and the work are relatively separated one from the other in the direction of the cradle axis. The rolling motion of both cradle and work spindle is reversed during which time an increment of motion is added to the work spindle such as to advance (index) the work relative to the cradle by one pitch. At the completion of the reversal of roll, called the return roll, relative cradle axial movement between cradle and work again occurs to bring the two into cutting position, whereupon a cycle is repeated to cut the following tooth. It will be understood that, if desired for certain cutting operations, a cutting action could be provided on the return roll, after which the cutter and work will be relatively withdrawn, and the work indexed for the next tooth cutting cycle.

THE GENERATING TRAIN

The generating train of the machine, as will be understood, is the complete connection between the cradle and work spindle for controlling the relative generating rotation of these two members. The illustrative embodiment of the generating train shown in FIG. 10 will now be traced. A worm gear 52 is fixed rotationally to the cradle 32, and this gear is engaged by a worm 54 connected to a telescoping shaft 56 on which is mounted a change gear 58. This is the point in the train where there is introduced a set of four change gears, a selection of which governs the ratio of generating roll between the cradle and work. Continuing through this latter set of change gears 60, 62, 64 through shaft 66, there is a connection to a suitable index differential gearing 68. Except during the indexing interval, which will be referred to again hereinbelow, the index differential 68 can be regarding as a simple train of gearing with gear 70 meshing with gear 72 which is rigidly connected to gear 74 meshing with a gear therebelow rigidly connected to gear 76 which in turn meshes with gear 78, as shown. Gear 78 is rigidly connected to or integral with bevel gear 80, in turn meshing with bevel gear 82 connected to shaft 84.

Shaft 84 is keyed for rotation to another bevel gear 86 engaging with a mating gear 88 fastened to a shaft 90 which is connected for rotation to a pinion 92 of a hypoid pair. The meshing hypoid gear 94 is rigidly connected to the work spindle. As will be understood, the work spindle is connected for rotation in the workhead assembly 40. This completes the trace of the generating train, that is, the gearing which links and controls the relative rotational motion of cradle and work during the generating rolls. It will be understood that this generating train will be capable of being rotated in either direction, for the forward and return rolls.

There will be a separate generating train, servocontrol arrangement therefore, and associated structures, (shown in FIG. 10), for each roughing station, as indicated in the copending application of Hunkeler et al., "Improvements in Bevel Gear Making."

THE INDEXING MECHANISM

A suitable indexing mechanism 96 will be provided, and in this connection, reference is made to U.S. Pat. Nos. 3,229,552 and 3,283,660, the disclosures of which are incorporated herein by reference. The teachings of those patents indicate suitable indexing mechanisms that may be utilized in part in connection with the generating train, in the present invention. In an indexing step, the cradle 32 may be considered as fixed against rotation, and likewise cradle gear 52, worm 54 and related elements of the generating train, as will be evident. In the operation of the index 96, an index rack 98 will be moved in a direction perpendicular to the plane of the diagram in FIG. 10 and through a fixed distance by a suitable hydraulic piston (not shown). The rack 98 engages a pinion 100 which is made to turn exactly one revolution as a result of the controlled distance of rack travel. Pinion 100 drives a gear 102 through an axially engageable and disengageable one tooth clutch 104. During the forward or indexing stroke of the rack, clutch 104 is held in engagement by hydraulic pressure in cylinder 105, as will be understood. One turn of gear 102 produces a corresponding single turn of mating gear 106, which produces one turn of the coaxial and connected change gear 108. During the indexing motion of gears 106 and 108, a locking pawl 110 is made to disengage from a notch in a locking disc 112 connected to and corotatable with the gears 106 and 108. At the completion of the one turn, the locking pawl is made to reengage disc 112.

The change gear ratio 108, 114 is so chosen that an appropriate rotational increment is produced in the gear 114, producing in turn the identical increment in the connected differential spider 116. Spider 116 carries the differential pinions around the stationary gear 70. The action of the differential is such as to produce a turning of gear 78 relative to gear 70, equal to exactly twice the turning increment of the spider 116. The appropriate rotational increment in gear 114, controlled by the index change gear selection, must be such that the amount of turning of differential gear 78 relative to differential gear 70 will produce, by way of generating train elements 78 through 94, an increment of work spindle turning relative to the fixed cradle equal to one pitch of the work.

It will be recalled that for the purpose of explaining the function of the indexing mechanism, the cradle was considered as fixed rotationally. In actual operation, however, the indexing can be made to occur while the cradle is turning as, for example, during the noncutting portion or return roll of the cycle. The increment of index rotation produced in the work relative to the cradle is the same.

At the completion of one indexing step, hydraulic pressure in cylinder 105 will be released permitting disengagement of clutch 104 and the rack 98 and pinion 100 will be returned to their original position, before the clutch is reengaged.

THE DRIVE FOR THE GENERATING TRAIN

Figure 10:
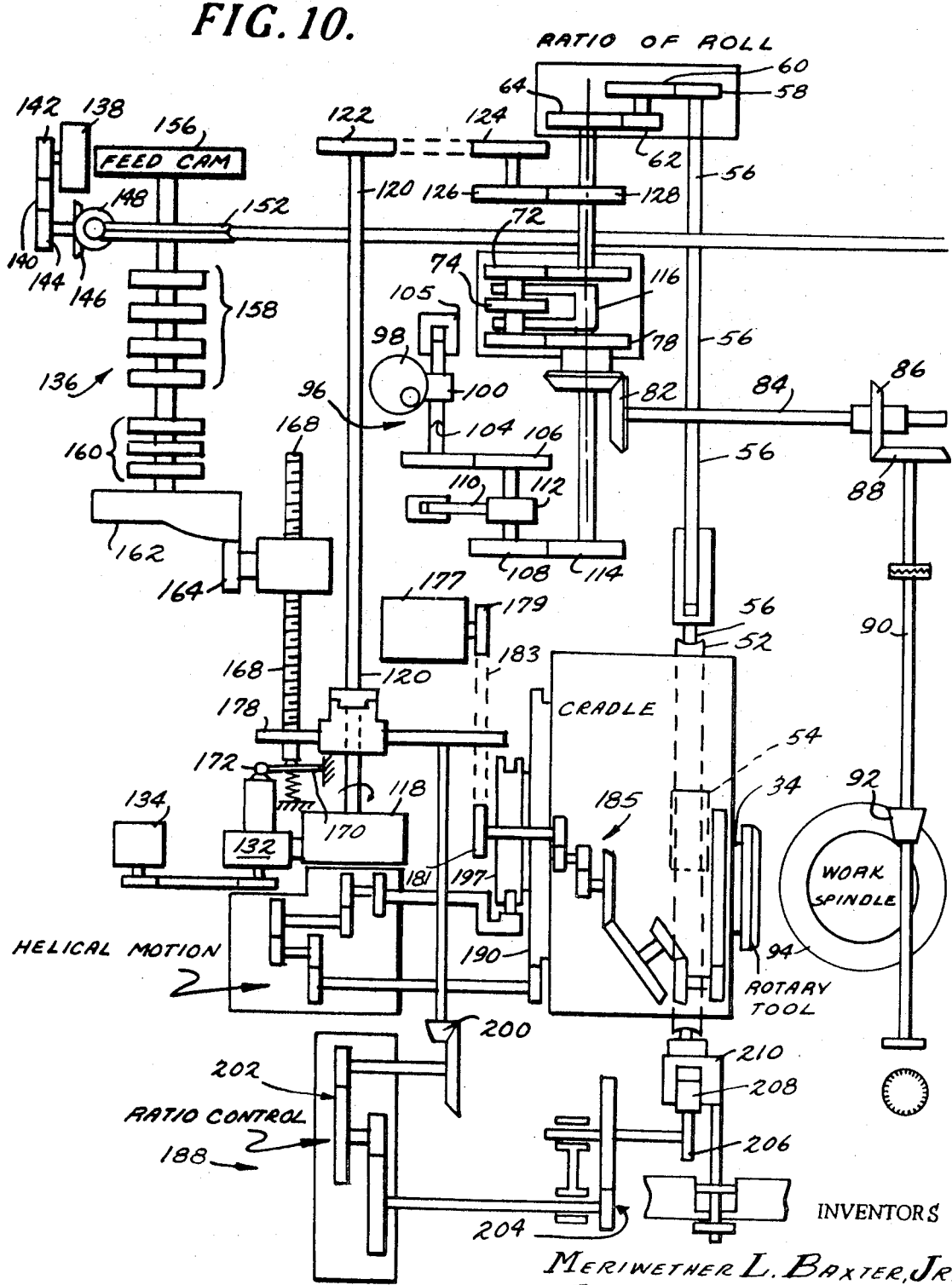
FIG. 10 is an enlarged diagrammatic view of a generating train and control arrangement therefor that may be utilized in practicing the present invention.

As shown in FIG. 10, the drive for the generating train includes a reversible hydraulic motor 118, driving through shaft 120 and roll change gears 122, 124 and fixed gearing 126, 128, the latter gear being rigidly attached to shaft 66 in the generating train. A controllable displacement, hydraulic pump 132 is shown as being connected to the hydraulic motor for controlled and reversible driving actuation thereof in conventional manner. The pump 132, in turn, is driven by a motor 134, which in the illustrative embodiment is a constant speed electric motor. The electric motor 134, hydraulic pump 132, and hydraulic motor 118 and the various driving connections therefore may all be of conventional design.

THE CUTTER DRIVE

The cutting tool, toolholder 34, and the cutter drive train are shown in FIG. 10 as driven by a separate power source, for example, an electric motor 177, through speed change pulleys 179, 181 and belt 183, and a train of gearing 185 within the cradle. This gearing may be of conventional design as disclosed, for example, in U.S. Pat. Nos. 2,667,818 and 3,288,031.

CONTROL SYSTEM FOR THE DRIVE TRAIN

The present development contemplates a novel control system for the drive train in combination with the novel structural orientation of the cradle housing, cradle, toolholder and workhead assembly, as referred to above. The control system, per se, is more fully disclosed and claimed in the copending application of Hunkeler et al., ("Improvements in Control Arrangements for Bevel Gear Making Machines," Ser. No. 764,213).

The illustrative embodiment of the control system, as best seen in FIG. 10, includes a servomechanism 136, comprising a variable speed DC motor 138 driving through belt 140 and pulleys 142, 144, and through right angle gearing 146, 148 to a worm 150 which in turn is drivingly engaged to a worm wheel 152. The worm wheel 152 is fixed to and rotates main camshaft 154 which is mounted for rotation suitably in a feed cam bracket (not shown) rigidly attached to the machine frame. The feed cam shaft 154 carries the feed cam 156, various hydraulic 158 and electrical 160 trip cams (for various purposes, such as producing appropriate timing for such functions as hydraulic pressure and release to the indexing mechanism, ratio control and various setovers as will be understood). A rise end cam, called a roll cam 162, is also driven by the cam shaft 154. The variable speed motor 138 will be adjusted to regulate the cycle time of the entire machine. In the present embodiment of the invention, one turn of the main camshaft 154 will produce one tooth cutting cycle.

A roll cam follower roller 164 is mounted on a nut 166 of a nut and screw 168 assembly, constituting a differential connection between the cam shaft 154 and the generating train, as will be apparent. The nut will be constrained against rotation but is free to translate or move axially. The screw 168 is free to translate axially and to rotate within the nonrotating nut 166, and the lower end of the screw, as shown in the drawing, bears on or against a pivoted lever 170, the free end 172 of which is arranged to actuate a hydraulic control valve system 173, of conventional design, and which includes a wobble plate valve (not shown). The wobble plate valve is designed to govern the direction and flow rate of the discharge of the pump to the hydraulic motor, and this establishes the direction and rate of motor rotation, as is understood.

A compression spring 174 is shown continuously urging the actuator 170 and screw 168 upwardly, as shown in FIG. 10, so as to urge the follower 164 into engagement with the roll cam 162.

When the cam 162 rotates from the position shown in FIG. 10, the follower 164, nut 166, screw 168 and actuator 170 will tend to move upward, as viewed in FIG. 10, as urged by the spring 174.

This movement will result in a valve movement permitting the pump to discharge fluid (for example, oil) at a certain rate and such as to rotate the motor 118 in the direction shown by the arrow. Fixed for rotation with the motor output shaft 120 is a gear 176 which is engaged to gear 178 fixed for rotation with screw 168. Rotation of the motor resulting from movement of the pump control valve regulating flow of the driving fluid to the motor will thus effect rotation of the screw 168 through the gears 176, 178, such that the screw 178 will thread itself downward within the nut 166 and tend to restore the lever 170 and control valve 173 to their original or neutral position. The lever and control valve will be restored to that neutral position unless further falling of the cam path, permitting further upward movement of the nut 166, results in a command for continuous discharge from the pump 132 to the motor 118. The pump 132 and motor 118 will both be of the positive displacement type, in the illustrative embodiment and thus it will be seen that a given rise or fall of the cam will produce a corresponding fixed number of turns of the motor 118, and the established rise of the cam 162 will produce a fixed number of turns each way of the shaft 120 per tooth cutting cycle.

Selection of the appropriate roll change gears 122 and 124 produces from the fixed number of turns of the shaft 120 a desired angle of turning in the work spindle, as required to fully generate one tooth contour. Selection of the ratio of roll change gears 58, 60, 62 and 64 in the generating train will produce the proper proportionate angle of cradle turning, as will be apparent. Thus, by suitable choice of these roll change gears and ratio of roll change gears the desired amount of roll for the work spindle and cradle can be predetermined, for example, depending upon the requirements of a particular cutting operation and cycle. However, the present development also contemplates a separate and novel means for effecting a change in this ratio of roll between the cradle and work spindle during operation so as to produce a different ratio of roll in one direction of roll than in the other direction of roll, as may be desired for certain cutting operations, for example, in the generation of spiral or hypoid pinion gears. This means for changing the ratio of roll, separate from the ratio or roll change gears mentioned above, will be described in more detail hereinbelow.

The feed cam 156, operating from the main cam shaft 154 for cycle control, preferably is arranged to actuate the cradle 32 axially toward and away from the work, as is disclosed in the copending application of Hunkeler et al., "Improved Cradle Assembly for Gear Cutting Machines and Means for Moving Cradle Axially."

It will be understood that the generating train, servocontrol mechanism 136 therefor, and the associated structures illustrated schematically in FIG. 10 preferably are duplicated for each of the two roughing stations and each of the two finishing stations of the double machines 20, 22, as indicated in the copending application of Hunkeler et al., "Improvements in Bevel Gear Making."

PRELIMINARY OR FIRST STAGE ROUGHING

Figure 1:
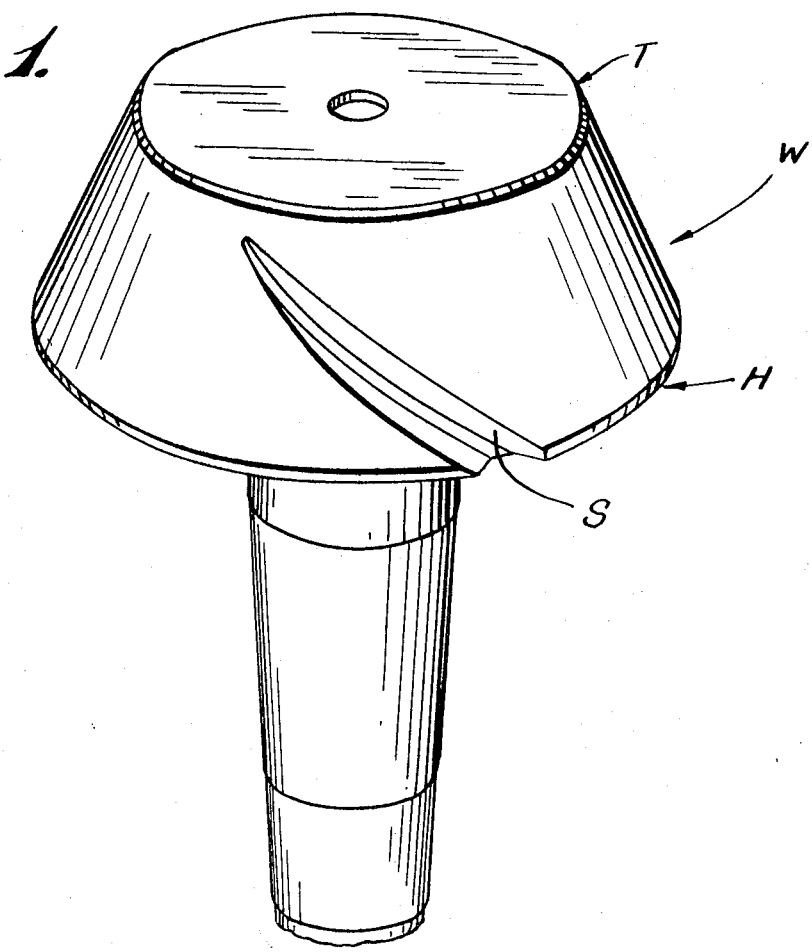
FIG. 1 is a perspective view of a gear blank having a partial tooth slot formed therein by a plunge feed between the work and tool, according to a process of the present invention.

According to the present invention, novel processes and techniques are contemplated for the first stage roughing operation which, in the illustrative arrangement of FIG. 9, may be performed at station 24b in machine 22. As indicated above, these processes include starting the cutting of a tooth slot with a plunge feed effected between the tool and workpiece W, with the tool first entering the workpiece at or in the region of the heel H thereof and only going to partial depth, that is, not to the full depth desired for the final roughed tooth slot. FIG. 1 illustrates a pinion gear blank having partially formed tooth slot S therein illustrative of the type of cut that may be effected by this plunge feed or plunge-type cutting. As will be understood, there is no rolling or generating between the tool and the workpiece for this initial, plunge cut. It will be effected in suitable manner, for example, by appropriate design of the feed cam 156, as will be understood from the disclosure of the copending Hunkeler et al., application "Improved Cradle Assembly for Gear Cutting Machines and Means for Moving Cradle Axially," referred to above. As disclosed in that application, the feed cam 156 is operatively structurally connected to the cradle to move it axially toward and away from the work and such structure preferably will be utilized with the feed cam 156 in the present invention and properly designed to effect the desired axial movements of the cradle (and the tool with it) toward and away from the work for the plunge feed, initial cut, and for withdrawal in connection with indexing, as will be evident.

After the plunge cut to partial depth has been completed, a forward generating roll toward the toe T will take place, during which a cutting action is effected. In this cutting, generating roll, in the method contemplated, there will be cutting on both the convex and concave sides of the tooth slot, and the tooth slot will be extended to the toe of the workpiece as shown, for example, in FIG. 2, whereby a first roughed tooth slot will be provided in an efficient and expeditious manner. In the illustrative arrangements shown in FIGS. 1 and 2, the plunge cut extends from the heel H of the workpiece a substantial distance toward the toe T so that the amplitude or extent of the generating roll following the plunge cut will not extend over substantial distances. However, as indicated above, the relative amounts of material removed by the plunge cut on the one hand, and the cutting generating action on the other, may be varied, as desired, depending upon factors such as the design requirements of the final tooth shape, the number of teeth to be cut, etc.

Figure 2:
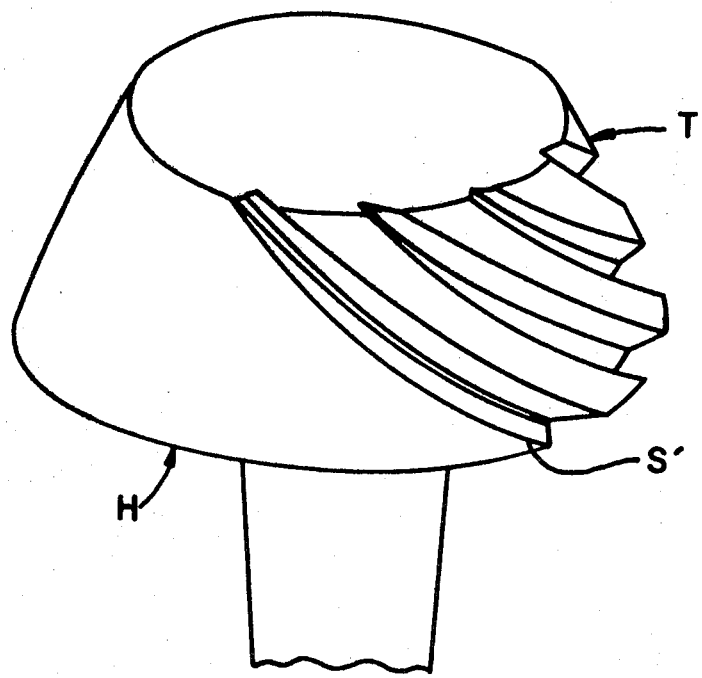
FIG. 2 is a photograph of a workpiece, corresponding to FIG. 1, and illustrating a plurality of tapered tooth slots as they would appear after being formed by a first stage roughing operation embodying the invention.
Figure 3:
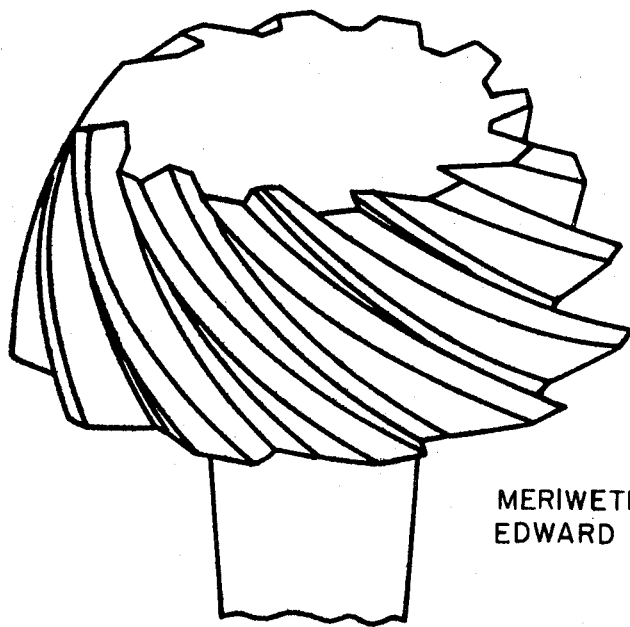
FIG. 3 is a photograph, corresponding to FIG. 2, and illustrating a workpiece after being subjected to two successive roughing operations, at two separate roughing stations and according to the present invention.

The shape of the roughed out tooth slot formed by the first stage roughing operation can be seen in FIG. 2. It will be noted from this figure that there is an unequally divided amount of stock yet to be removed from the convex and concave sides of the teeth to produce the final roughed tooth shape. Thus, during the second-stage roughing operation, to be described in more detail hereinbelow, it will be necessary to remove sufficient and unequal amounts of material from the convex and concave sides of the teeth so as to produce the desired tapered configuration for the final roughed tooth slots. FIG. 3 illustrates an exemplary configuration of a workpiece that has been subjected to both a first and a second-stage roughing operation according to the invention.

The generating cutting action in the first stage roughing operation, following the initial plunge feed between tool and work, will be effected in suitable manner, for example, by means of appropriate design of the roll cam 162 of the servocontrol mechanism 136, as will be understood. This servocontrol arrangement is disclosed in more detail in the copending Hunkeler et al., application "Improvements in Control Arrangements for Bevel Gear Making Machines."

Still referring to the first stage roughing operation, when the forward, cutting, generating roll, just referred to, has been completed, there will be the usual return roll, relative withdrawal between tool and workpiece, and indexing of the workpiece to move the latter into position for the next tooth slot to be cut, as will be understood. It is preferred that no cutting action take place during this return roll, whereby the return roll may be effected at higher speeds and in less time (once again, by suitable design of the roll cam 162), and relative withdrawal between cradle and work and indexing of the work may, therefore, be effected at some suitable time (as by appropriate design of the feed cam 156) so as to advantageously cut down or reduce the total cycle time.

After the work has been indexed, in the first stage roughing operation, there will be a partial generating roll (without cutting) prior to the next plunge feed for the purpose of eliminating backlash in the generating train so that in the subsequent cutting, generating roll, proper cutting action may be achieved. In other words, there will be no undesirable dwell time at the end of the plunge feed (gashing cut) and before the generating cutting action, referred to above. Thus, the partial roll (without cutting) will be advantageously instantaneously resumed in the later cutting, generating roll at or about at the end of the plunge feed (gashing cut).

After this partial roll, there will again be relative plunge feed between the tool and work to effect a plunge cut at or in the region of the heel of the workpiece and to partial depth, as discussed above. In the illustrative arrangement of roughing machine shown in FIGS. 7, 8, 9 and 10, the feed cam 156 will be so designed to effect this plunge feed at the proper time and to the desired depth. Thereafter, the generating train will again be activated through the roll cam 162 of the servomechanism 136 so as to provide a cutting generating roll between the work and tool, as understood. Thus, in the exemplary roughing machine arrangement, the roll cam 162 and feed cam 156 will be so designed as to effect the proper timed relationship between the plunge feed and the cutting, forward generating roll. And in view of the fact that the cutting generating roll is abbreviated in amplitude, as discussed above, this roll may be accomplished in a relatively short time, as by proper design of the roll cam 162, again so as to cut production time.

As indicated above, at the end of the forward cutting roll, there will be the return roll, relative withdrawal between the work and the tool, and work indexing. The roll cam 162 may be so designed as to effect this return roll in an even shorter time than the forward generating roll since there will be no cutting on the return roll. Thus, in the first roughing stage, there is no need for any ratio-change mechanism, nor is there any need for any of the setover mechanisms, such as disclosed in the copending application of Hunkeler et al., "Improvements in Ratio-Change and Set-Over Mechanisms in Bevel Gear Making Machines," and these structures may therefore be advantageously omitted from the first stage roughing machine.

Inasmuch as there is no cutting on the return roll, the feed cam 156 may be so designed as to begin withdrawal of the cradle and tool during that roll, whereby the work may be indexed sooner than if it were necessary to wait for the return roll to be completed before indexing the work, thus providing a further reduction in the cycle time.

For the sake of indicating the type of cutting action contemplated in the first and second stage roughing operations according to the invention, and comparing them with a conventional single stage, complete roughing operation, reference will be made to FIGS. 4, 5 and 6. FIG. 4 illustrates schematically a tooth slot defined by the numbers 1,2,3 and 4. This tooth slot (which would be tapered for spiral bevel and hypoid gears) corresponds to the final roughed tooth slot desired, before a finishing operation, and it is illustrated as being cut entirely by a generating roll wherein the amplitude of the generating roll is indicated by the distance marked by the legend "Generation" in that figure. It will be noted that the position of the cutting tool in FIG. 4 at the start of the generating roll is indicated schematically by centerline $C_r$ and the curved line $M$, as being sufficiently far to the right of the heel $H$ so as to begin the cutting action at the heel, and the generating roll continues to the toe of the slot wherein the center line of the cutter is indicated schematically as $C_1$. This would correspond to so-called ratio-change roughing for tapered tooth slots where on the return roll the ratio of roll between the tool and work would be varied, for example, as disclosed in the Wildhaber Pat. No. 2,342,232, and with cutting action going on during both rolls, as is understood.

FIG. 5 illustrates schematically the first stage roughing operation of the present invention wherein the centerline $C_r$ indicates schematically the position for the cutting tool at the beginning of the plunge feed, and the distance identified by the legend "Plunge Cut" indicates the cutting distance covered by the plunge feed, after which generation will begin and will continue until until the centerline of the tool reaches the position indicated by $C_1$ in that figure. After the centerline of the tool reaches the position indicated schematically by $C_1$ in FIG. 5, there will be relative withdrawal between the workpiece and the tool after which there will be a return roll. This return roll will terminate short of the roll out point of generation at the heel (1—2), as indicated. It will be noted that the amplitude of generation in this first stage is substantially less than the amplitude of generation indicated in FIG. 4, and furthermore, the plunge cut does not go to the full depth of the desired final roughed tooth slot, but a certain amount of material is left, as indicated by the crosshatching in the region 1, 1', 4', 4 in FIG. 5. Furthermore, it will be appreciated that the forward and return generating rolls each advantageously terminate short of the roll out points of generation at both the heel and toe of the workpiece, as clearly shown in FIG. 5.

FIG. 6 illustrates the second stage roughing operation according to the present development, and here again it will be noted that the amplitude of generation is still less than the amplitude of generation required in the conventional method, illustrated in FIG. 4, inasmuch as the tooth slot has already been partially cut. During the second stage roughing, the amount of stock indicated by crosshatching in FIG. 5 will be removed, as well as material on the convex and concave sides of the tooth slots, so as to produce the final, roughed tooth shape, an exemplarly configuration of which is illustrated in FIG. 3. However, it will be understood that the relative amounts of plunge cut and generation for the first stage roughing may be varied as desired, and the second stage roughing operation, in the illustrative arrangement under consideration, preferably includes the ratio-change mechanism and setovers disclosed in the copending application of Hunkeler et al., referred to above, as will be discussed in more detail hereinbelow.

AUTOMATIC LOADING AND UNLOADING AND STOCK DIVISION

Figure 8:
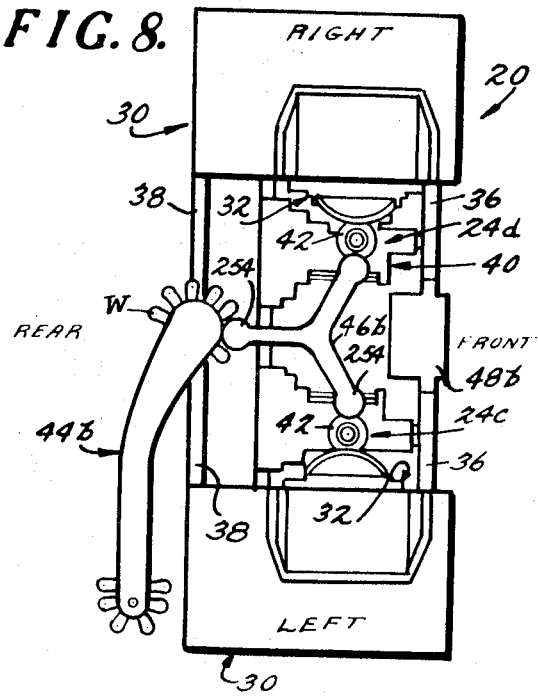
FIG. 8 is a schematic plan view, again on a reduced scale, illustrating a double machine that may be utilized to provide two finishing stations for first- and second-stage finishing operations.

It is also contemplated in the present invention that conveyor means and a loader-transfer mechanism be provided for automatically conveying workpieces to the machine, automatically loading them onto the work holder at the first roughing station, automatically transferring workpieces, after receiving preliminary roughing, to the second roughing station to be subjected to a second roughing operation, and thereafter automatically transferring the workpiece to a discharge region. Additionally, it is contemplated that automatic stock division take place in moving the workpiece from the first to the second roughing station, thus eliminating the need for any manual operations in the entire two-stage roughing cycle. Suitable structures and techniques for effecting this automatic conveying, loading, unloading and stock division are disclosed in the U.S. Pat. to Hunkeler et al., No. 3,520,227 granted July 14, 1970. Such a conveyor 44 and loader-transfer mechanism 46 are shown in FIGS. 7, 8 and 9. The loader-transfer mechanism is in the form of a turret having three arms and adapted to be periodically rotated and vertically reciprocated in connection with the work loading and unloading operations and in coordination with the step-by-step feeding action of the conveyor means 44, as disclosed in the copending applications just mentioned.

In connection with the operation of the loader-transfer mechanism, it will be noted that the workhead assembly 40 is designed in the present development to undergo movements between a work loading and unloading position, on the one hand, and a work cutting position, on the other hand, in timed relation with the operation of the loader-transfer turret 46, as disclosed in the copending applications of Hunkeler et al., "Workhead Assembly and Mounting Therefor, in Bevel Gear Making Machines," and the Hunkeler et al. U.S. Pat. referred to in the preceding paragraph. Furthermore, and in connection with automatic stock division, as referred to above, it will be appreciated that the roll centering device disclosed in the aforesaid copending application of Hunkeler et al. "Improvements in Control Arrangements for Bevel Gear Making Machines" may be utilized.

SECOND-STAGE ROUGHING

It is contemplated that the second stage roughing operation performed, for example, at the second roughing station 24a of the double roughing machine 22 (see FIG. 9) will effect a stock removal from the convex and concave sides of the tooth slot and also from the bottom of the tooth slot, formed in the first stage roughing operation, so as to approximate more closely the desired, finished tooth shape, as will be effected in the double finishing machine 20, for example, as disclosed in the copending applications of Helfer et al., "Apparatus for Transferring Work Blanks and Work Pieces in Bevel Gear Making Machines" and Hunkeler et al., "Control Apparatus for Checking and Controlling Sequential Machine Operations." As indicated above, FIG. 3 illustrates an exemplary tooth configuration for the workpiece after it leaves the second roughing station, and by comparison with FIG. 2, an observation may be made as to metal removed in the second-stage roughing operation for the exemplary tooth configurations there shown.

RATIO-CHANGE MECHANISM AND ROTATIONAL SETOVER

The structures and procedures involved in the ratio-change mechanism and cradle rotational setover will now be described with reference being made to FIGS. 10—20, it being understood that these structures are designed primarily for use in the second stage roughing operation, after the work has left the first roughing station, and they may be advantageously omitted from the first roughing station.

It is contemplated that the ratio-of-roll between cradle and work will be determined for one direction of roll by the ratio-of-roll change gears 58, 60, 62 and 64, as shown in the drive diagram in FIG. 10. For this direction of roll, the ratio-change mechanism 188 will not have any effect on the roll, as will be apparent as the description proceeds. For the opposite direction of roll, however, the ratio-change mechanism will have an effect on the roll, and as will be understood as the description proceeds, it imparts an axial movement in a particular direction to the cradle drive worm 54 which will either add to or subtract from the rotational motion of the worm gear 52 affixed to the cradle and caused to rotate through the generating train gearing and shaft 56 to the cradle worm 54.

Referring now to FIG. 10, it will be seen that the ratio control or ratio-change mechanism includes a gear 198 driven by the gear 176 on the shaft 120 of the generating train. Gear 198 is connected through shaft 199 to right angle gearing 200 and then through a train of gears 202 to a shaft 203. Shaft 203 includes a gear 205 at the other end thereof and in mesh with gear 207 on shaft 209. Shaft 209 includes a cam 206 drivingly affixed thereto, as indicated. All of these parts will be arranged in suitable structures in the machines, as will be understood.

Figure 11:
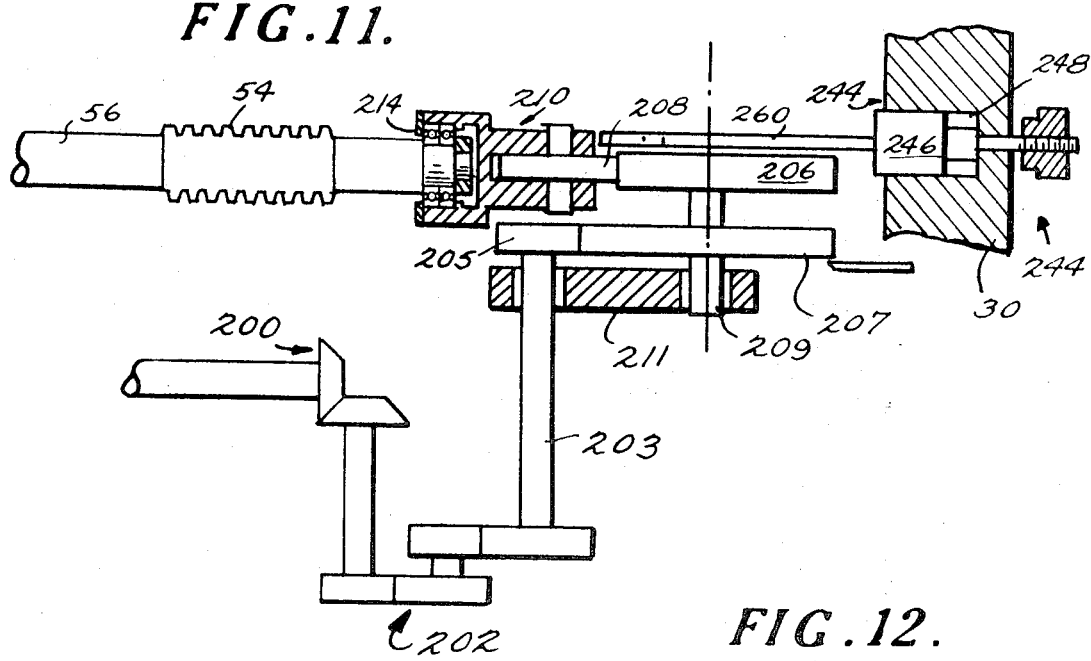
FIG. 11 is an enlarged and fragmentary schematic plan view of a portion of the ratio control means as shown in FIG. 10.
Figure 12:
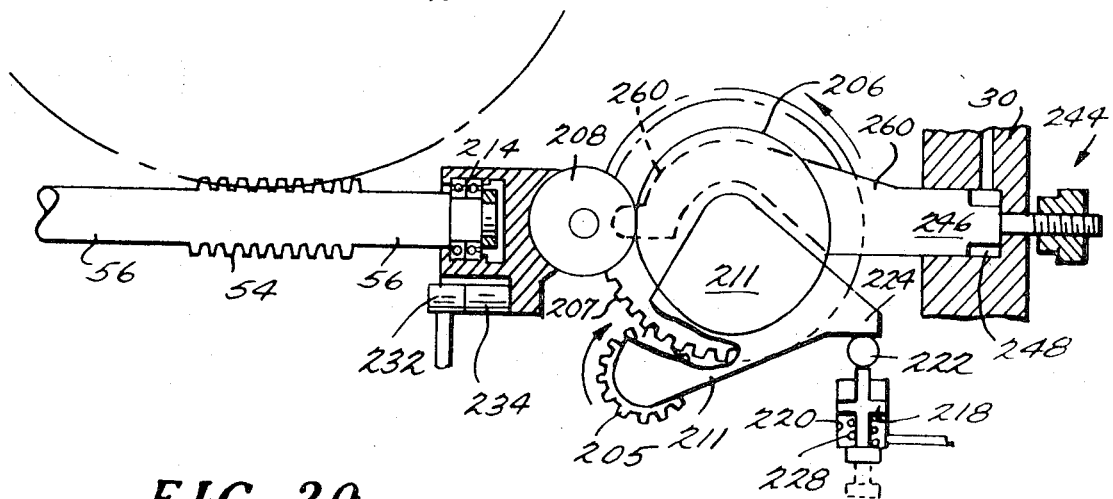
FIG. 12 is an elevational view of the structure as shown in FIG. 11.

Referring now to FIGS. 10, 11 and 12, it will be seen that shafts 203, 209 are journaled in a cam bracket 211 which is suitably arranged for pivoting about the axis of shaft 203 as a fixed axis and for a purpose to be described hereinbelow. The cam 206 is designed to be selectively urged against a cam follower roller 208 mounted for rotation in follower bracket 210, as best seen in FIG. 4. An end of the shaft 56 carrying the cradle worm 54 is shown suitably journaled in thrust bearings 214 held within a retaining cartridge 215 connected to the follower bracket 210. Thus, back and forth motion of the follower 208 will control axial motion of the worm 54. In this connection, bracket 210 is shown in FIG. 13 as being slidably mounted in the worm bracket 216 of the cradle housing 30.

A piston 218 is shown in FIG. 12 arranged in a cylinder 220 and carrying a member 222 at the upper end thereof and in engagement with the free end 224 of the cam bracket 211, as shown. A fluid line 226 is shown as being connected to the cylinder 220, at the lower end thereof, for the timed introduction of fluid pressure into the cylinder to elevate the piston 218, and hold it in the position shown in FIG. 12. When this pressure is released, it will be appreciated that the piston will be urged down in the cylinder to its retracted position under the weight of the cam bracket 211, gear 207 and cam 206. But a yieldable compression spring 228 is arranged in the cylinder 220, as shown in FIG. 6 to tend to hold bracket 211 in the position shown.

Figure 13:
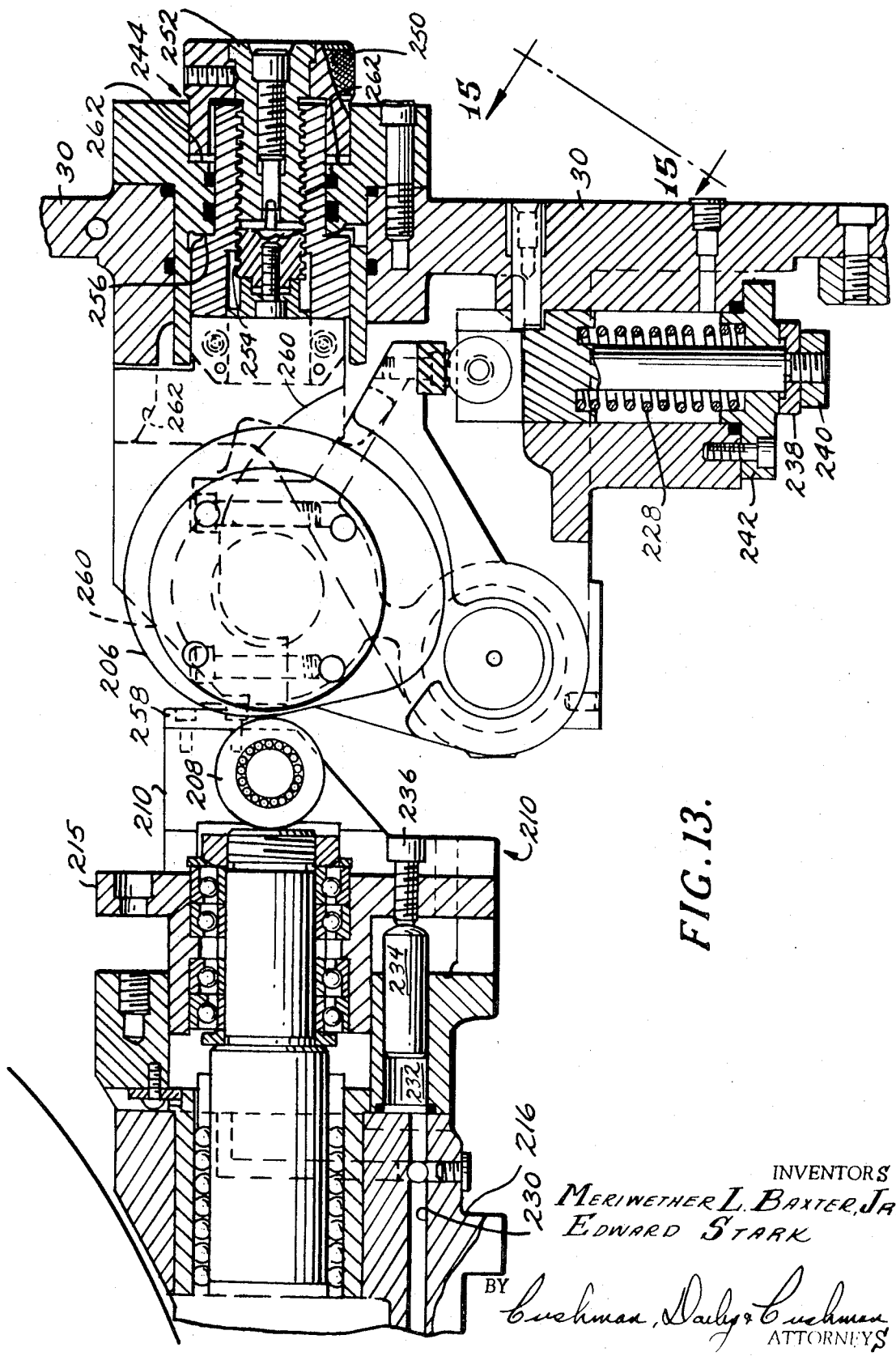
FIG. 13 is an enlarged elevational view corresponding to FIG. 12 and showing more of the structural details.

As shown in FIGS. 12 and 13, the follower bracket 210 will be continuously urged to the right during cutting operations. In the illustrative embodiment shown, this is accomplished by means of fluid or hydraulic pressure in line 230 entering cylinder 232 and urging piston 234 therein to the right against the follower bracket 210 so as continuously to urge the roller or follower 208 to the right and in engagement with the cam 206. This fluid pressure will be of such magnitude as to yield to the action of the cam surface of cam 206 when the latter tends to move the follower 208 and shaft 56 to the left as viewed in FIGS. 12 and 13, as will be appreciated. Piston 234 is shown as being slidably arranged in worm bracket 216 in the cradle housing, and a plurality of these pistons and cylinders 232 may be provided engaging the follower bracket 210 at several points to provide for a more uniform distribution of pressure thereon. A screw 236 is shown carried by the follower bracket 210 and engaged by the piston 234.

As will be understood, when the cam bracket 211 is held in the position thereof shown in FIG. 12 by fluid pressure in the cylinder 220, the cam 206 will be rotating in engagement with the follower roller 208. Rotation of the cam 206 will operate in conjunction with the fluid pressure in the cylinder 232 urging the roller 208 against the cam 206, to effect axial movement of the shaft 56 carrying the worm 54, in accordance with the contour of the surface of the cam 206 so as to affect the rotation of the worm gear 52 on the cradle 32. Cam 206 will be so operative during the time it is desired to change the ratio of roll between the cradle and work from what it would otherwise be under the influence only of the ratio of roll change gears 58, 60, 62 and 64 of the generating train. However, during a roll whenever it is desired to have only these latter gears operate to determine the ratio of roll between cradle and work, the pressure in cylinder 220 will be released, and rotation of the cam 206 will not effect any movement of the worm shaft 56. Thus, the ratio change mechanism 188 will be disabled or not active during that particular roll. It is only when pressure is introduced into cylinder 220 to hold the piston 218 elevated that the ratio of change mechanism will be enabled or active to effect the desired change in the ratio of roll.

Cylinder 220 may be suitably attached to the cradle housing 30 and piston 218 is shown as having a collar 238 attached thereto by nut 240 to provide a positive stop against the cylinder cap 242, for upward piston movement.

During the roll direction in which the ratio change mechanism is operative, the axial position of the cradle worm will thus be under the control of the ratio of roll cam 206 being rotated about its axis which is held in a fixed position by the interaction of the piston 218 hydraulically forced against the positive stop 242 and the follower roller 208 hydraulically forced against the cam surface by pistons 234 acting against elements 210, 215.

The present invention also contemplates novel structures for effecting cradle rotational setover which may be used for size control, as will be understood. In the illustrative embodiment, and as seen particularly in FIGS. 11, 12, 13 and 14, this cradle rotational setover mechanism 244 preferably is designed to operate instantaneously before the roll reverses at the end of the roll direction during which the ratio change mechanism 188 is enabled or active, and before the roll reverses to the direction in which the ratio change mechanism is disabled. The structure of the cradle rotational setover means will then take control of the cradle worm axial position away from the ratio change cam 206, and will effect an abrupt change in that position, that is, in the position of the cradle worm 54, thereby producing a corresponding abrupt change in the cradle rotational position, for the purpose indicated.

As best seen in FIGS. 11, 12 and 13, there is provided a setover piston 246 actuated by hydraulic pressure in cylinder 248 and which has its axial position moved alternately to the left, in FIG. 13, for one direction of setover prior to the beginning of one cradle roll direction, and to the right prior to the beginning of the opposite direction of cradle rolling. Suitable means are provided for adjustment of the amount of travel available for the piston 246. As shown in FIG. 13, this includes a hand adjusting wheel 250 which carries threaded elements 252 and 254 screwed in the piston, and a dial 251 is also provided. The inner end of wheel 250 forms an adjustable gap with the adjacent facing shoulder of the cylinder 248. This total adjusted gap exists when the pressure in cylinder 248 is released and the piston 246 is being held in a position fully to the right against the stop 256. The force to hold the piston to the right originates with the hydraulic pressure continuously present in cylinders 232 acting through pistons 234 and bracket 210 and cartridge 215. Bracket 210 carries a stop plate 258 designed to be engaged by the left end of a stop arm 260 which is suitably directly fastened to the piston 246, as shown.

The stop arm 260 travels axially with piston 246 and both are prevented from rotation by means of the arm 260, engaging in a slot 262 in the cradle housing 30 which preferably mounts both cylinders 220 and 248, as shown.

When pressure is admitted to the cylinder 248 through some suitable fluid port, the cradle rotational setover piston 246 will be moved to the left, as viewed in FIGS. 11—13 until the inner end of wheel 250 strikes the stop surface 262. This will effect a setover of the worm 54 axially to the left, through the curved stop arm 260 and stop plate 258. Simultaneously pressure will be released from the cylinder 220 thereby disabling the ratio-change mechanism 188. For this part of the cycle, which may be either an up or a down roll as chosen, pressure will remain in the cylinder 248 and will remain exhausted from the cylinder 220.

The ratio-change cam 206 will continue to rotate, being driven by the gear 205, and the axis of the cam 206 will remain in the position shown if on a falling path of its surface, or if the cam is rotating such as to present a rising path to the follower 208, the cam bracket will merely lower against the light pressure of compression spring 228 in cylinder 220, and in either case, the rotating cam will have no effect on the axial position of the cradle worm at this time, and the pressure in cylinder 248 will prevent axial movement of worm 54 to the right.

When pressure is then readmitted to the cylinder 248 approximately simultaneously with the next reversal of cradle roll, pressure will be exhausted from the cylinder 248. This release of the pressure in the latter cylinder will permit movement to the right of the piston 246, stop arm 260 and cradle worm; however, it will be noted that such return movement of these parts may or may not take place depending, for example, on the design and adjustment of the cam 206. In other words, if a rising part of the cam is in engagement with the roller 208 at this time, return movement of the roller to the right will be prevented. Cam 206 will thus be urged by pressure in the cylinder 220 to return to or remain in the position thereof shown in FIG. 13 and established by the positive stop 242 on the cylinder cap. Rotation of the cam will reverse with the reversal of cradle roll, and the cam will reassume control of the axial positioning and axial movement of cradle worm 54, as will be understood.

Figure 14:
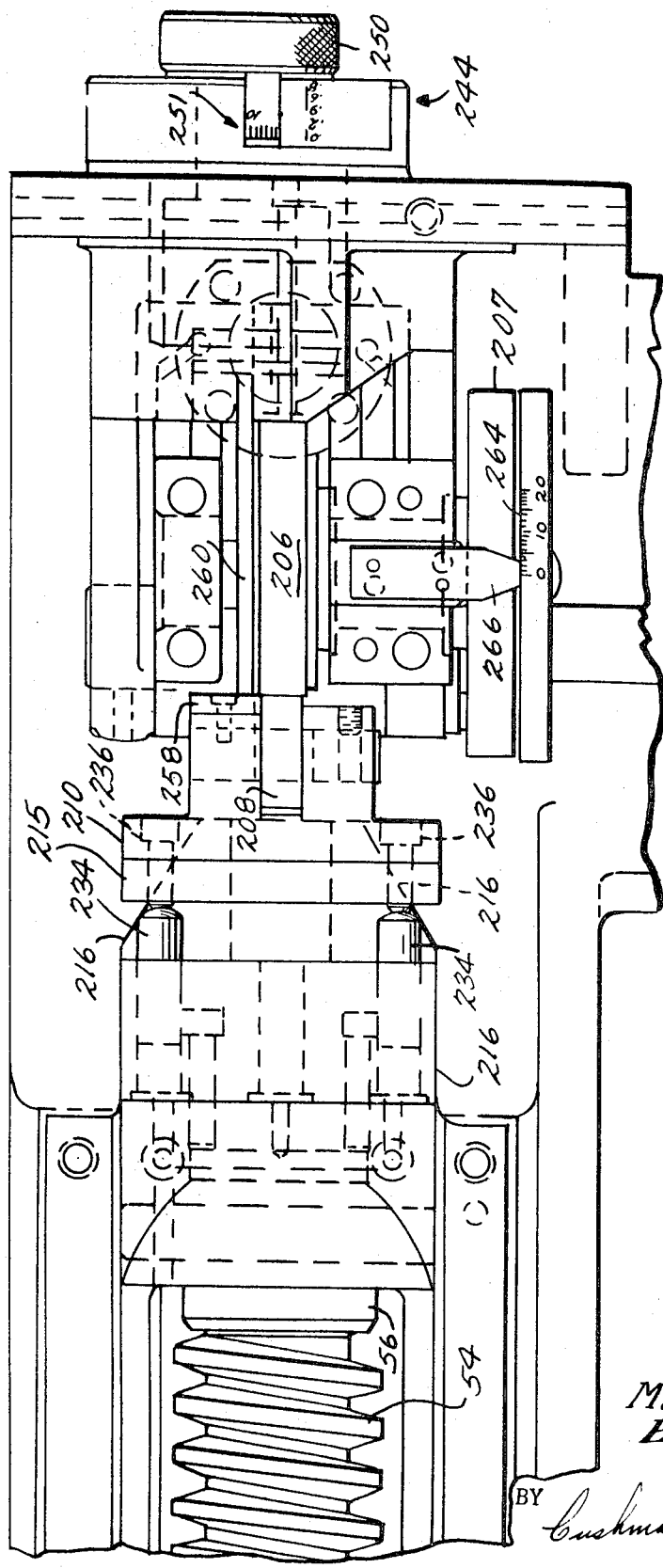
FIG. 14 is an enlarged view corresponding to FIG. 11 and showing more of the structural details.
Figure 15:
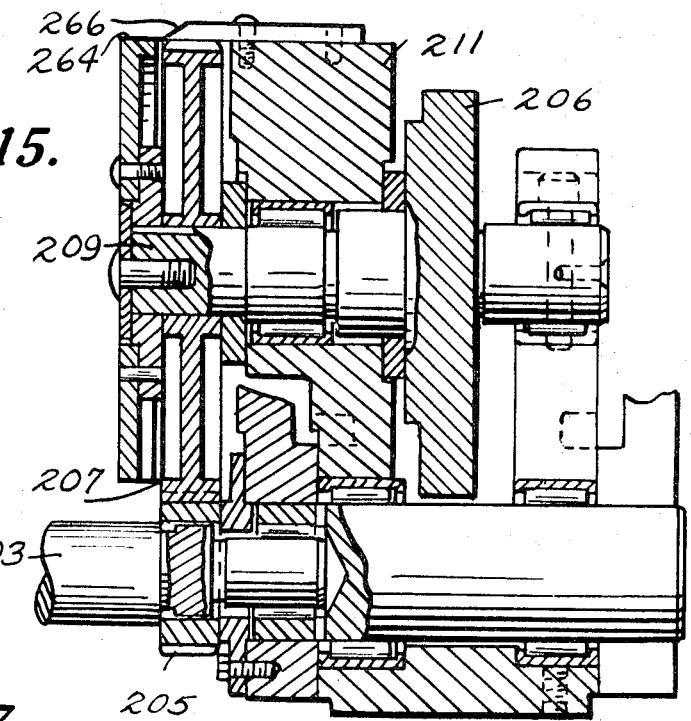
FIG. 15 is an enlarged view of the structure shown in FIG. 13 and viewed in the direction of arrows 15-15 in that figure.

A suitable dial 264 and pointer 266 may be provided, as shown in FIGS. 14 and 15, in connection with indicating and setting the position for cam 206, as will be evident.

CRADLE AXIAL SETOVER

The illustrative embodiment of the cradle axial setover mechanism is shown in FIGS. 18 and 19. As shown, this mechanism includes an adjustable displacement hydraulic piston 270 operating in a cylinder 272 suitably mounted on the cradle housing 30 of the roughing machine and preferably directly in the corresponding position occupied by the helical motion cam and follower (not shown) of a finishing machine. The piston 270 acts directly on a roller 274 carried by a crank 276 drivingly connected to an eccentric member 278, arranged for driving or moving the cradle in a direction along its axis, as is disclosed more fully in the copending application of Hunkeler et al., "Improved Cradle Assembly For Gear Cutting Machines and Means For Moving Cradle Axially." When pressure is admitted to the cylinder 272, as through port 280, the piston 270 will be moved downwardly to rotate the crank 276 and eccentric 278 counterclockwise, as viewed in FIG. 18, and this counterclockwise rotation of the crank will effect an abrupt withdrawal of the cradle axially in the cradle housing, and against pressure exerted on the cradle to keep it in an advanced position, as will be understood from the copending application just referred to. The amount of withdrawal of the cradle will be controlled by the adjustable gap 282 which limits the downward movement of the piston against the top of the cylinder, as will be evident. A suitable adjusting knob 284 may be provided at the top of the piston 270, for example, in threaded connection therewith, as shown, so that rotation of the knob will effect an increase or decrease in the size of the gap 282 to increase or decrease the stroke of the piston, thereby increasing or decreasing the amount of axial movement of the cradle caused thereby. A pin 286 is shown as arranged in the lower end of the cylinder 272 and extending into a vertical slot in the piston so as to permit rotary adjusting movements of the knob 284 while the piston is held stationary rotationally thereby.

For the return setover, pressure will be exhausted from the cylinder 272 and the crank will be rotated clockwise, as viewed in FIG. 18 (being actuated by pressure in the cradle as disclosed in the last referred to copending application) to move the piston 270 upwardly until the cradle returns or advances axially inwardly to the position controlled by a positive stop (not shown) therefor.

HYPOID OFFSET SETOVER

Figure 17:
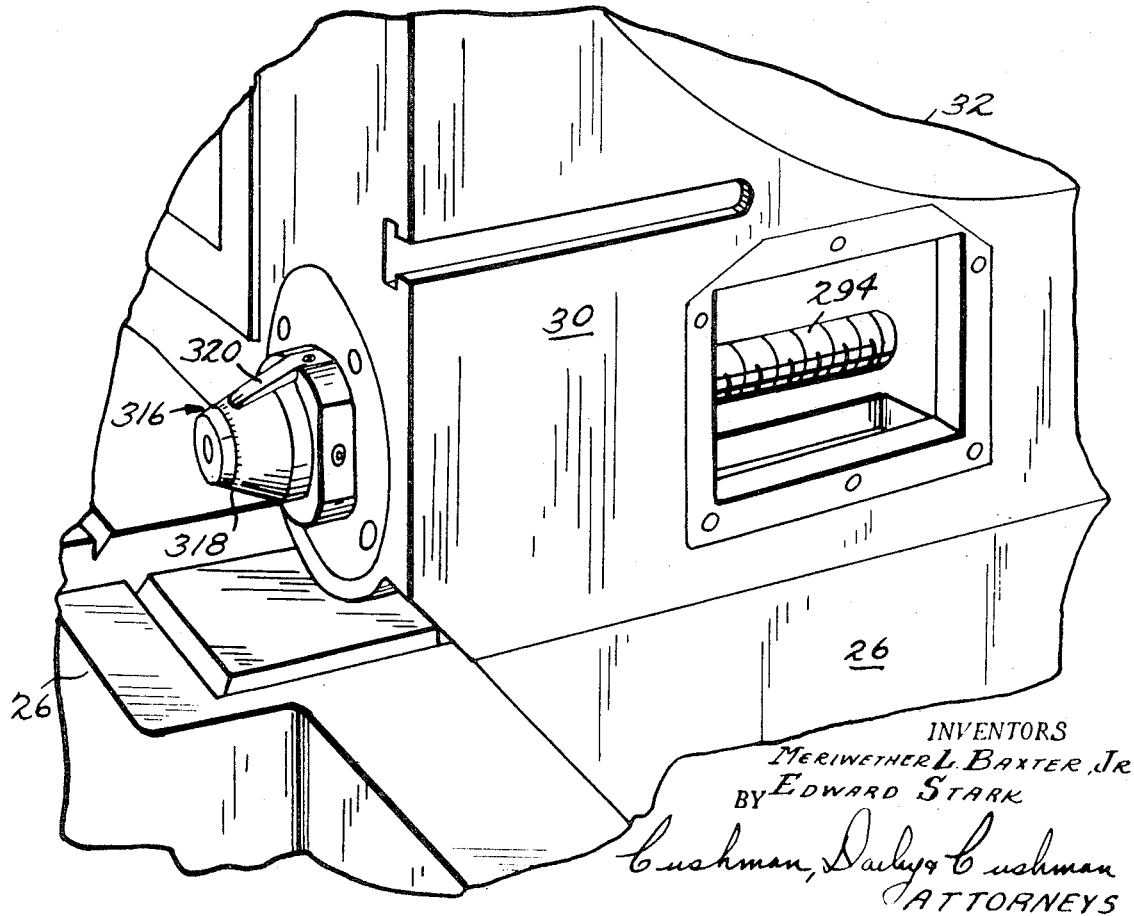
FIG. 17 is a fragmentary perspective view showing certain parts of the hypoid offset setover construction of FIG. 16.
Figure 16:
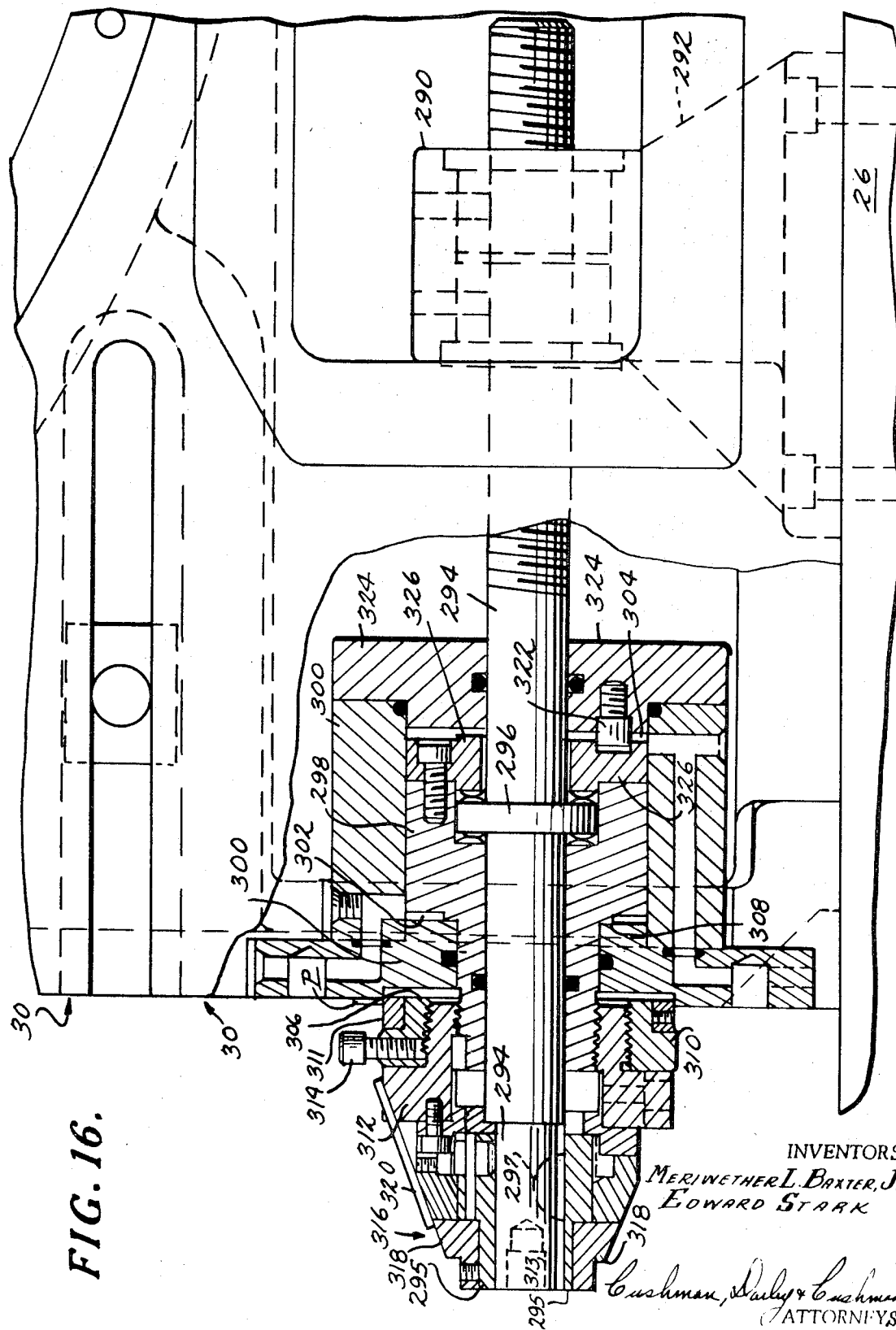
FIG. 16 is an enlarged, fragmentary and partially vertically sectioned view of a hypoid offset setover designed for use in the second stage roughing operation.

The illustrative embodiment of fro hypoid offset mechanism 288 is shown in FIGS. 16 and 17. It is contemplated that this mechanism will operate so as to provide for both a substantial offset of the cradle axis horizontally and at right angles to the work axis (also to the normal cradle axis), for example, during initial setup, and a lesser but abrupt setover to and fro from this basic position during operation. It is further contemplated that these adjusting movements of the cradle be accomplished by movement of the entire cradle housing 30 with respect to the machine frame 26. As best seen in FIG. 16, this mechanism includes an internally threaded element 290 mounted in fixed or stationary position in a bracket 292 suitably fixed to the machine frame. A threaded stem member 294 is screwed through the nutlike element 290 and is adapted to be threaded in either direction within this element. As shown, the left end of the stem 294 is provided with a collar 296 suitably journaled and held axially in a recess within a piston member 298, as shown. This piston is arranged for sliding movement within the cylinder 300 which is suitably attached in fixed position to the cradle housing 30.

Relative movements of the piston 298 and cylinder 300 are provided by the hypoid offset setover. In the action of this setover the piston will remain stationary relative to the machine frame, and with pressure reversals, for example, admitting oil under pressure alternately to the left and right cylinder ends 302 and 304 through suitable passageways, as shown, the cylinder carrying with it the entire cradle housing will be moved alternately to the left until it strikes the positive stop 306, and to the right until it strikes positive stop 308, the piston head. Suitable means may be provided by adjusting the gap or distance between these stops 306, 308, as shown. Such means includes an internally threaded calibrated adjusting nut 310 calibrated on a loose sleeve 311 and adjustably screwed onto a threaded member 312 fastened to the piston 298 in a locked position therewith, as shown. When adjustment of nut 310 is made, the locking screw 314 will be tightened, fixing the nut in this adjusted position relative to the threaded member 312. A pointer P may be provided, as shown.

For making the much larger, basic hypoid offset setting of the cradle, pressure can be admitted to one side of the cylinder, as at the right-hand end thereof, as viewed in FIG. 16 and the screw 294 will be manually rotated by suitable means so as to move axially in the stationary bracket 292 and carry with it axially the entire assembly including the piston 298, cylinder 300 and cradle housing 30.

A differential calibrated dial assembly 316 is shown as arranged on the left end of the threaded member 294, and includes a dial 318 adjustably connected to the member 294, as by setscrew contact with a sleeve 295 keyed to the member 294, as indicated at 297. The dial assembly includes a pointer 320 carried by member 312. While making the larger, basic hypoid offset setting, the dial 318 will rotate with the threaded member 294 and the pointer and member 312 will not rotate, as will be evident. Suitable means may be provided for preventing rotation of the piston 298 as, for example, a pin 322 carried by the cylinder cap 324 and slidably received in a corresponding slot in the piston end member 326, as shown. The left end of the threaded member 294 is shown as including a hole or socket 313 adapted to receive a suitable tool for manually rotating the member 294, as during set up.

SETOVER CONTROLS

Figure 20:
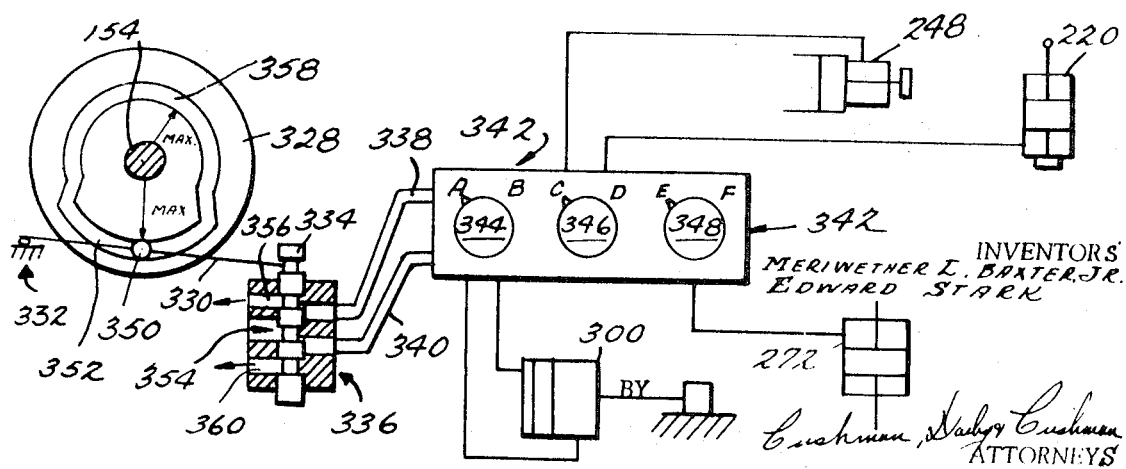
FIG. 20 is a schematic and diagrammatic view of an exemplary hydraulic control arrangement for the ratio change mechanism and various setovers, referred to above, in the second stage roughing operation.

An exemplary arrangement of a hydraulic control system that may be utilized for the ratio-change mechanism and the related cradle rotational, cradle axial and hypoid offset setovers is shown schematically in FIG. 20, and includes a trip cam 328. The trip cam 328 preferably is one of the hydraulic cams on the cam shaft 154 of the servomechanism 136, shown in FIG. 10. As noted hereinabove, this shaft preferably makes one revolution per tooth cutting cycle consisting of an up and a down roll and a work indexing step. The cam 328 is shown in FIG. 13 as actuating a pivoted follower lever 330, pivoted at the left end thereof at 332, and operatively connected to a multiheaded piston 334 to reciprocate the latter up and down as viewed in FIG. 20 in the pilot valve 336. Actuation of the pilot valve to either its up or down positions will admit hydraulic pressure selectively to one or the other of the two lines 338, 340 communicating with directional valve manifold 342. There are three valves 344, 346, 348 provided in this manifold, adapted to connect the lines 338, 340 with the cylinders 220, 248, 272 and 300 for the ratio-change mechanism, the relative rotational setover, the cradle axial setover, and the hypoid setover, respectively. Each of these directional valves is provided with two positions for determining the relative directions for each of the various setovers and their timing relationship with the enable and disable of the ratio-change mechanism 188. The two positions A, B of directional valve 344 are designed to communicate with the cylinder 300 of the hypoid offset setover. The two positions C, D of the directional valve 346 are adapted to be placed in fluid communication respectively with the cylinder 248 of the cradle rotational setover and the cylinder 220 of the ratio-change mechanism. The position E of directional valve 348 is designed to place the fluid line 338 in communication with the cradle axial setover cylinder 272, while the position F of this valve will place fluid line 340 in communication with the cylinder 272.

It will be noted that when piston 334 is down (while follower 350 is in the slot 352 of maximum radius on trip cam 328), the inlet line 354 will be in communication with lower line 340, and upper line 338 will be on exhaust through port 356; and when the piston is up (while follower 350 is in the slot 358 of minimum radius on the trip cam), the inlet line 354 will be in communication with the upper line 338, and lower line 340 will be on exhaust through port 360.

It will be understood that various combinations of positions and actuating sequences of valves 344, 346, 348 may be utilized, depending on the requirements of the finished gear, and the direction of roll, etc. Suitable means (not shown) may be provided for automatically actuating the valves 344, 346, 348 in desired sequence, during cutting operations, as will be understood.

OPERATION

The roughing operations according to the invention have been indicated above, but for the sake of convenience they will be repeated in this section in order to indicate their coordination with the contemplated overall production line, as disclosed in the copending application of Hunkeler et al., "Improvements in Bevel Gear Making," and also in order to indicate advantages over prior art. Thus, referring to FIG. 9, which illustrates an exemplary arrangement of a double roughing and double finishing machine of the present development, and work will be fed in step-by-step fashion on the conveyor 44a to the roughing machine 22. The loader transfer mechanism 46 will operate to load workpieces from the conveyor 44a onto the workhead assemblies 40 at the two roughing stations, and with automatic stock division taking place when moving the work from the first roughing station to the second roughing station, as indicated above. Thus, once the production line has been started up, there will be cutting action taking place simultaneously on the work pieces at the two cutting stations 24b, 24a of the roughing machine 22. After the second roughing operation, the work pieces are redeposited back on the conveyor 44a and are subjected to a chamfering operation by passing through the chamfering means 50, and they are then suitably transferred to the conveyor 44b to be fed to the finishing machine 20, for automatic finishing operations, as disclosed in the copending application of Helfer et al., "Apparatus For Transferring Work Blanks and Work Pieces In Bevel Gear Making Machines."

The cycle time for the roughing operations preferably will be designed so as to be substantially the same as the cycle time for the finishing operations whereby a more fully automated and continually flowing production line may be achieved.

The division of the gear roughing into two separate operations is designed to enable the roughing machine 22 to produce rough cut gears at a faster rate than has heretofore been possible, at a lower overall cost, and with greater cutter life, as noted above.

As indicated above, in the first stage roughing operation according to the invention, there will be an initial plunge feed between work and tool to partial tooth depth, followed by a generating roll during which both sides of the tooth slot will be cut. This will be followed by a return roll during which there will be no cutting action, and there will be the usual relative withdrawal between tool and work and indexing of the work at a suitable time with the tool being positioned, after the end of the return roll, in proper position for the next plunge feed to start cutting the next tooth slot, as will be understood. Thus, after the end of the return roll, in an exemplary arrangement, there will be a partial feed roll without any cutting (effected by proper design of the roll cam 162) for the purposes indicated above and also for the purpose of securing the proper relative position between tool and work for the plunge feed. After the workpiece has been completely preliminarily roughed at the first roughing station 24b, it will be transferred to the second roughing station 24a by the loader transfer mechanism 46, and there subjected to a second roughing operation, as indicated above.

During this second roughing operation, which will now be described in more detail, there will be cutting on both the up and down roll, and for the sake of this description, it will be assumed that the cutting operation will begin at the top of the down roll (although it will be understood that, if desired, the cutting cycle may begin with the bottom of an up roll). Thus, with cutting starting at the top of a down roll, rolling will proceed and in one exemplary arrangement, cutting will take place on both sides of the tooth slot and the ratio of roll between cradle and work may be controlled only by the ratio of roll gears 58, 60, 62 and 64, during this roll, and the speed of the roll may be controlled by suitable design of the roll cam 162, as will be evident.

When the bottom of the roll is reached, it is contemplated that three setovers take place as follows: (a) there is a rotational setover of the cradle effected through the rotational setover mechanism, including the piston 248 and stop arm 260, as described above (this is for the purpose of cutting the taper); (b) there is a hypoid offset setover of the cradle effected by the hypoid offset mechanism moving the cradle housing 30 and cradle 32 in a direction perpendicular to the work axis; (c) there is an axial setover of the cradle effected by the cradle axial setover mechanism. The purpose of the hypoid offset setover and cradle axial setover is to improve the correspondence of the roughed tooth and tooth slot contours to their finished contours. The magnitude of these three setovers (a), (b) and (c) will be determined by design requirements, for example, different design requirements may dictate using more or less of these setovers, and in an additive or subtractive way, as will be evident.

Continuing now with the description of the tooth cutting cycle, on the return or up roll, the opposite side of the tooth slot (for example, the convex side) will now be cut with the ratio of roll between cradle and work different as a result of the action of the ratio-change mechanism 188 which was moved into its enabling position. This ratio change will be accomplished in the illustrative embodiment of the invention by imparting a slow axial movement to the cradle worm during the roll, thereby extending or reducing the roll, as desired. It is contemplated that both sides of the tooth slot may be cut on the return roll, if desired.

At or near completion of the up roll, withdrawal of the cradle from the work will be begun, and the work will be indexed (this indexing could, therefore, be begun, if desired, to save time, before top dead center and continue until completed), then the various setovers will be reversed so as to return the cradle and work to their proper positions to begin a new cycle.

It will be noted the structures and techniques of the present invention provide for an increased production rate of roughed gears closely approximating the desired finished contours so as to facilitate finishing operations. The several setover mechanisms preferably are integrated with the ratio change mechanism 188 and servocontrol mechanism 136 for this purpose, as described above, and are intended to provide a smoother operation, greater efficiency and better coordination of the various desired movements, while providing novel and relatively simplified structures for this purpose in the interest of overall machine simplification.

In the Krastel et al., U.S. Pat. No. 3,288,031, it was proposed to completely rough a pinion in a single stage roughing operation. In that patent, it was suggested that there be an initial plunge feed between work and tool to the complete final depth of the tooth slot at the heel. This was then followed by a generating roll during which both sides of the tooth slot were cut. Then there were setovers followed by a second generating or return roll during which only one side of the tooth slot would be cut. At the end of that return roll there were the usual steps of withdrawal and indexing of the work and simultaneously there was a rolling action without cutting to position the cutter and work in the proper relative positions for the next plunge feed. Because of the demands imposed by having to completely rough the tooth slot in one roughing operation, in the Krastel et al. patent, such a method would not be suitable for the high-speed production contemplated in the present development.

It will therefore be evident that there will be maximum metal removal in minimum time in the first stage roughing operation. Because this stage is not designed to produce the desired final, roughed tooth shape, the cutter may be advantageously designed for substantially equal metal removal by each of the cutter blades, and the blades may further be advantageously of greater point width, so as to have longer life and more uniform cutting load distribution. For example, three basic types of blades may be used, one for cutting the concave side of the tooth slot, one for cutting the convex side of the tooth slot, and one for end or bottom tooth slot cutting, and these blades may be advantageously arranged in the cutter tool, for example, with the end blades interspersed with the side cutting blades.

Cutter peripheral speed, blade material, blade angles, rake angles and relief angles can be optimally chosen to be best adapted to high rates of metal removal in minimum time in the first roughing stage. It is contemplated that the cutter peripheral speed will be relatively slow with relatively large chip removal.

In the second roughing station, a different cutter will be utilized. In this stage, the correct shape of the final, roughed tooth slot will be produced, at full depth. Since substantial material has been removed in the first roughing stage, the cutter for the second stage roughing operation may be optimally designed with more cutter blades, and operating at higher peripheral speeds. The blades will have a narrower point width, in the second stage cutter, but since there will not be substantial metal removal in this stage, cutter blade life will be satisfactory.

It will thus be seen that the objects of this invention have been fully and effectively accomplished. It will be realized, however, that the foregoing specific embodiments have been shown and described only for the purpose of illustrating the principles of the invention and are subject to extensive change without departure from such principles. Therefore, this invention includes all modifications encompassed within the spirit and scope of the following claims.

What we claim is:

1. In the method of making bevel gears having tapering tooth slots using a tool mounted in a movable toolholder and a workholder mounting a workpiece, with means providing for generating rolls between tool and workpiece, a preliminary roughing operation comprising the steps of: effecting a plunge feed between the tool and the workpiece to provide a partial tooth slot of less than the depth of the final, desired, roughed tooth slot; providing a cutting, generating, forward roll between the tool and workpiece; and then providing a return roll between the tool and workpiece, said forward and return rolls each terminating short of the roll out points of generation at both the toe and heel of the workpiece.

2. The method defined in claim 1 wherein there is no cutting action on the return roll, and wherein there is no additional depth feed between the tool and the workpiece during the forward generating roll.

3. The method defined in claim 1 wherein the workpiece is a bevel pinion gear blank and wherein the plunge feed occurs in the region of the heel of the workpiece.

4. In the method of making bevel gears of tapering tooth slots wherein gear blanks are first rough cut and wherein there are provided two rough cutting stations, each including a tool mounted in a movable toolholder and a workholder mounting a workpiece and means providing for generating rolls between tool and workpiece, and improvement which comprises: subjecting a workpiece to a first roughing operation at the first of said stations wherein tooth slots are rough cut in the workpiece only to partial depth; transferring the workpiece to the second of said roughing stations; and completing the roughing operation at said second station, by a further rough cut wherein the tooth slots are shaped more substantially to the desired, finished configuration thereof and including removal of material from the bottom of the tooth slots.

5. The method defined in claim 4 wherein said first roughing operation includes: effecting a plunge feed between the tool and the workpiece at the beginning of the cutting cycle for a tooth slot and terminating the plunge feed at a depth less than the depth of the final, desired, roughed tooth slot.

6. The method defined in claim 5 wherein said first roughing operation further includes a cutting, generating, forward roll between tool and workpiece at the end of said plunge feed while still only cutting the tooth slot to partial depth, and then effecting a return roll between tool and workpiece, said forward and return rolls each terminating short of the roll out points of generation at both the toe and heel of the workpiece.

7. The method defined in claim 6 wherein there is no cutting action on the return roll.

8. The method defined in claim 6 wherein there are no setovers at the end of the cutting roll.

9. The method defined in claim 4 wherein the second roughing operation includes a first generating roll, and a return generating roll, with cutting being performed during both rolls, and with the ratio of roll between tool and workpiece different for each of said rolls.

10. The method defined in claim 9 and further wherein cutting operations are going on simultaneously on two different workpieces, one at each of said stations.

11. The method defined in claim 10 and further including feeding workpieces in the form of gear blanks to a first region adjacent and first roughing station, automatically and periodically feeding gear blanks from said region to said first cutting station and then to said second cutting station and then to a discharge region, so as to provide a single production line.

12. The method defined in claim 11 wherein said discharge region coincides with said first region and further wherein the workpiece is automatically positioned in the workholder in said second station in a certain, predetermined relation to the tool at that station for automatic stock division during the second roughing operation.

13. The method defined in claim 6 wherein the second roughing operation includes a first generating roll, and a return generating roll, with cutting being performed during both rolls, and with the ratio of roll between tool and workpiece different for each of said rolls.

14. The method defined in claim 13 and further wherein cutting operations are going on simultaneously on two different workpieces, one at each of said stations.

15. The method defined in claim 14 and further including feeding workpieces in the form of gear blanks to a first region adjacent said first roughing station, automatically and periodically feeding gear blanks from said region to said first cutting station and then to said second cutting station and then to a discharge region, so as to provide a single production line.

16. The method defined in claim 15 wherein said discharge region coincides with said first region and further wherein the workpiece is automatically positioned in the workholder in said second station in a certain, predetermined relation to the tool at that station for automatic stock division during the second roughing operation.

17. In the method of making bevel gears having tapering tooth slots using a tool mounted in a movable toolholder and a workholder mounting a workpiece, with means providing for generating rolls between tool and workpiece, a preliminary roughing operation for forming roughed tooth slots in sequence and comprising the steps of: effecting a plunge feed between the tool and the workpiece to provide a partial tooth slot of less than the depth of the final, desired, roughed tooth slot; providing a cutting, generating forward roll between the tool and workpiece whereby the preliminary, roughed tooth slot is produced; then providing a return roll between tool and workpiece during which no cutting takes place and indexing the workpiece for the next tooth slot to be cut therein; providing a partial forward generating roll without cutting prior to forming the next tooth slot; effecting a plunge feed between the tool and the workpiece to provide a partial tooth slot of less than the final, desired depth for the next roughed tooth slot; and then providing a cutting forward generating roll between tool and workpiece whereby the next preliminary, roughed tooth slot is produced, said forward and return rolls each terminating short of the roll out points of generation at both the toe and heel of the workpiece.

18. A method of rough cutting bevel gears in two successive operations at two successive stations wherein each station includes a tool mounted in a movable toolholder and a workholder mounting a workpiece, with means providing for generating rolls between tool and workpiece, the first of said operations comprising a plunge feed between the tool and the workpiece without a generating roll and only to partial depth of the final roughed tooth slot desired and thereafter providing a cutting, generating roll at the same partial depth to produce a preliminary, roughed tooth slot, and thereafter providing for relative withdrawal between the tool and the workpiece and rapid return roll between the tool and the workpiece, and then indexing the workpiece for the next tooth slot to be roughed, and the second of said operations comprising cutting the preliminary roughed tooth slots to the depth desired for the final roughed tooth slot.

19. The method defined in claim 18 wherein said second operation includes a first generating roll, and a second generating roll, with cutting being performed during both rolls and with the ratio of roll between tool and workpiece different for each of said rolls.

20. The method defined in claim 1 wherein the forward and return generating rolls each terminate a relatively substantial distance short of the roll out points of generation at both the toe and heel of the workpiece.

21. In the method of making bevel gears having tapering tooth slots using a tool mounted in a movable toolholder and a workholder mounting a workpiece, with means providing for generating rolls between tool and workpiece, rough cutting the tooth slots in the workpiece in two separate stages wherein the first stage comprises the steps of: effecting a plunge feed between the tool and the workpiece to provide a partial tooth slot of less than the depth of the final, desired, roughed tooth slot; providing a cutting, generating, forward roll between the tool and workpiece; and then providing a return roll between the tool and workpiece, said forward and return rolls each terminating short of the roll out points of generation at both the toe and heel of the workpiece.